Sept. 12, 1950  O. S. FIELD ET AL  2,522,029
AIRPLANE APPROACH CONTROL SYSTEM
Filed Jan. 22, 1945  11 Sheets-Sheet 1

Inventors
O.S.Field, S.N.Wight and R.W.Hewes
By Neil W. Preston,
Their Attorney

Sept. 12, 1950

O. S. FIELD ET AL 2,522,029

AIRPLANE APPROACH CONTROL SYSTEM

Filed Jan. 22, 1945

Inventors
O. S. Field, S. N. Wight and R. W. Hewes
By
Neil W. Preston,
Their Attorney Sept. 12, 1950    O. S. FIELD ET AL    2,522,029
AIRPLANE APPROACH CONTROL SYSTEM
Filed Jan. 22, 1945    11 Sheets-Sheet 3
FIG. 5
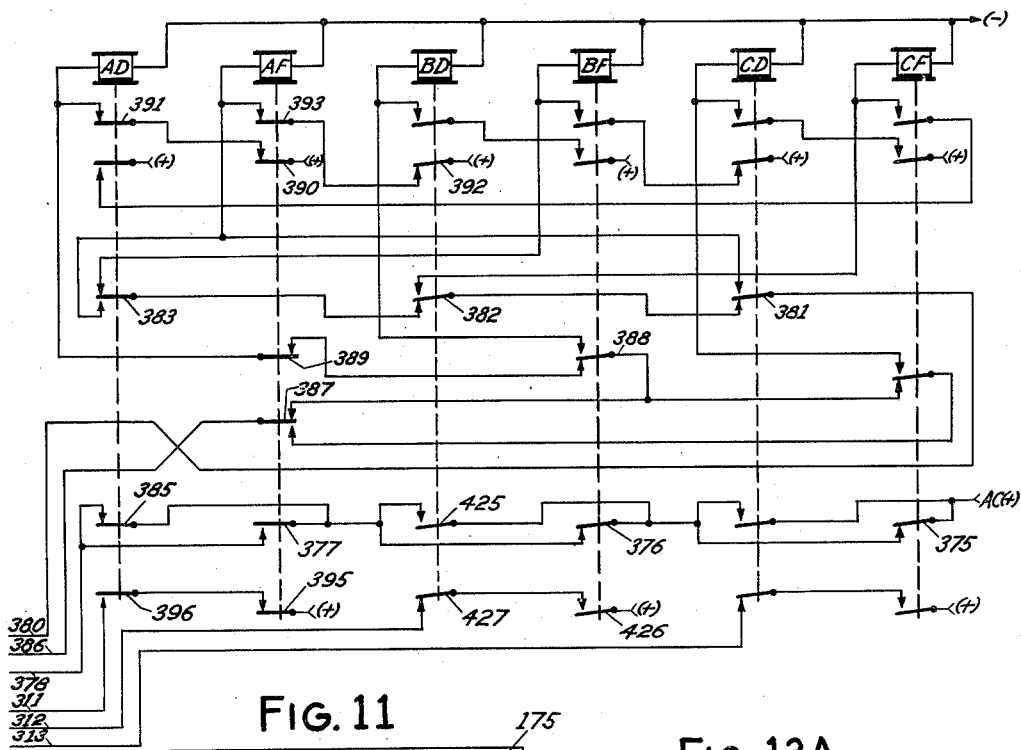
FIG. 11
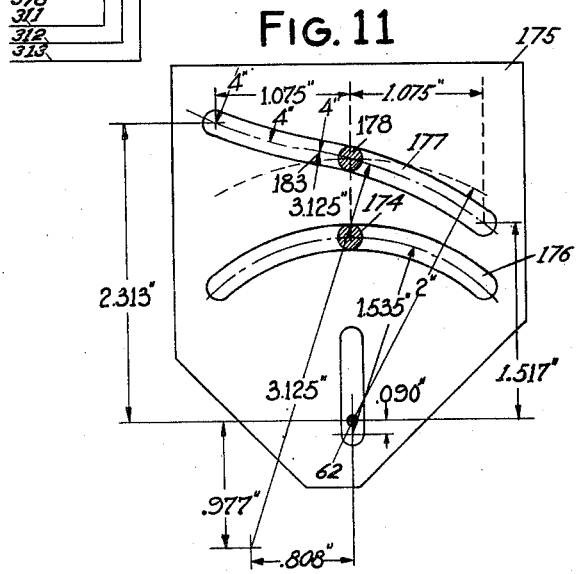
FIG. 13A
$$ADA = \frac{CT \cdot D°}{OT}$$
$$Min. ADA = \frac{1.086}{2.305} D° = 0.47D° \text{ when } SLT = 0$$
$$Max. ADA = \frac{1.196}{1} D° = 1.196 D° \text{ when } SLT = 2.5$$
As SLT varies from 0 to 2.5 ADA varies 0.47D° to 1.196D°
Inventors
O.S. Field, S.N. Wight and R.W. Hewes
By Neil W. Preston,
Their Attorney Sept. 12, 1950        O. S. FIELD ET AL        2,522,029
AIRPLANE APPROACH CONTROL SYSTEM
Filed Jan. 22, 1945        11 Sheets-Sheet 5

Inventors
O. S. Field, S. N. Wight and R. W. Hewes
By Neil W. Preston,
Their Attorney

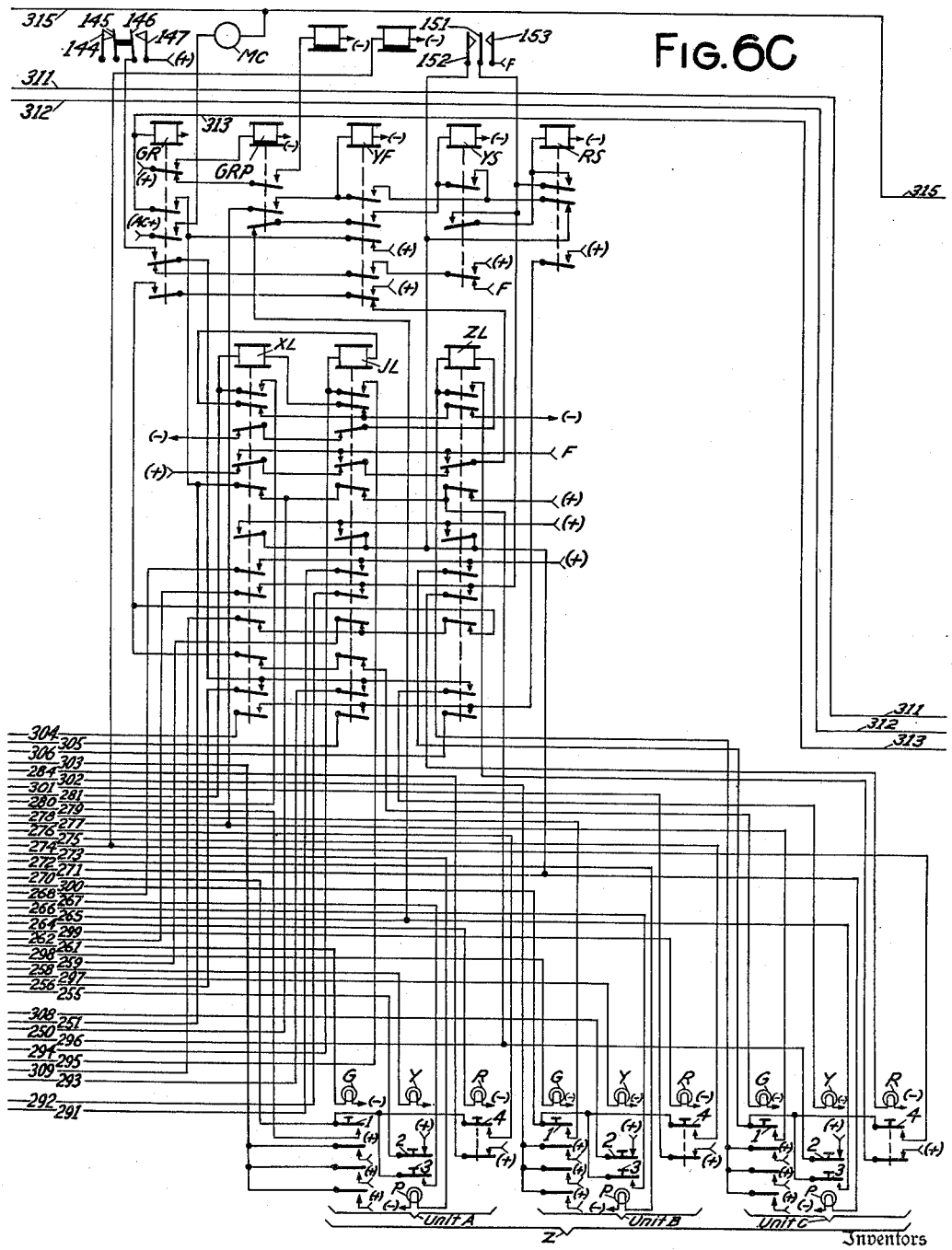

Sept. 12, 1950 O. S. FIELD ET AL 2,522,029
AIRPLANE APPROACH CONTROL SYSTEM
Filed Jan. 22, 1945 11 Sheets-Sheet 7

Inventors
O. S. Field, S. N. Wight and R. W. Hewes
By Neil W. Preston,
Their Attorney Sept. 12, 1950     O. S. FIELD ET AL     2,522,029
AIRPLANE APPROACH CONTROL SYSTEM
Filed Jan. 22, 1945     11 Sheets-Sheet 8
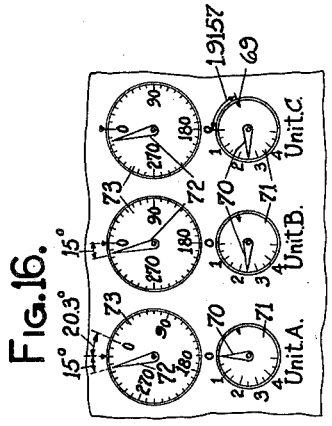
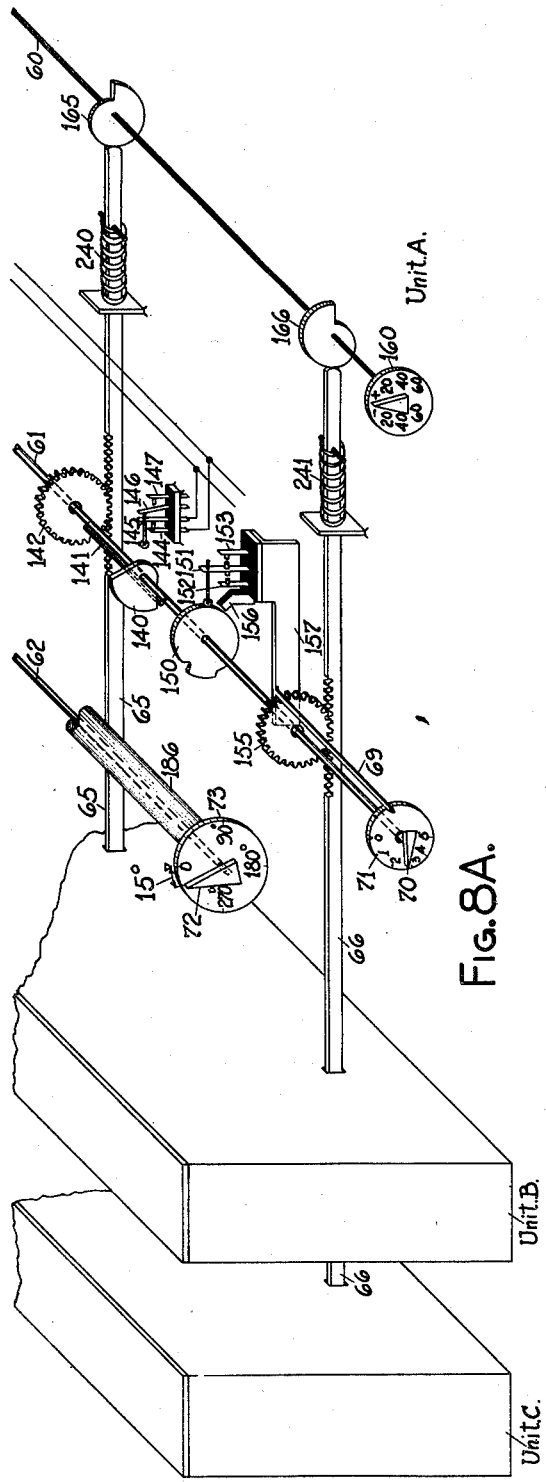
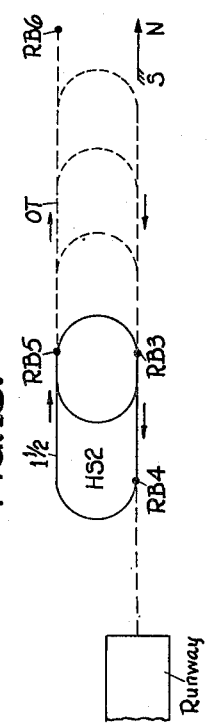
Inventors
O.S. Field, S.N. Wight and R.W. Hewes
By Neil W. Preston,
Their Attorney

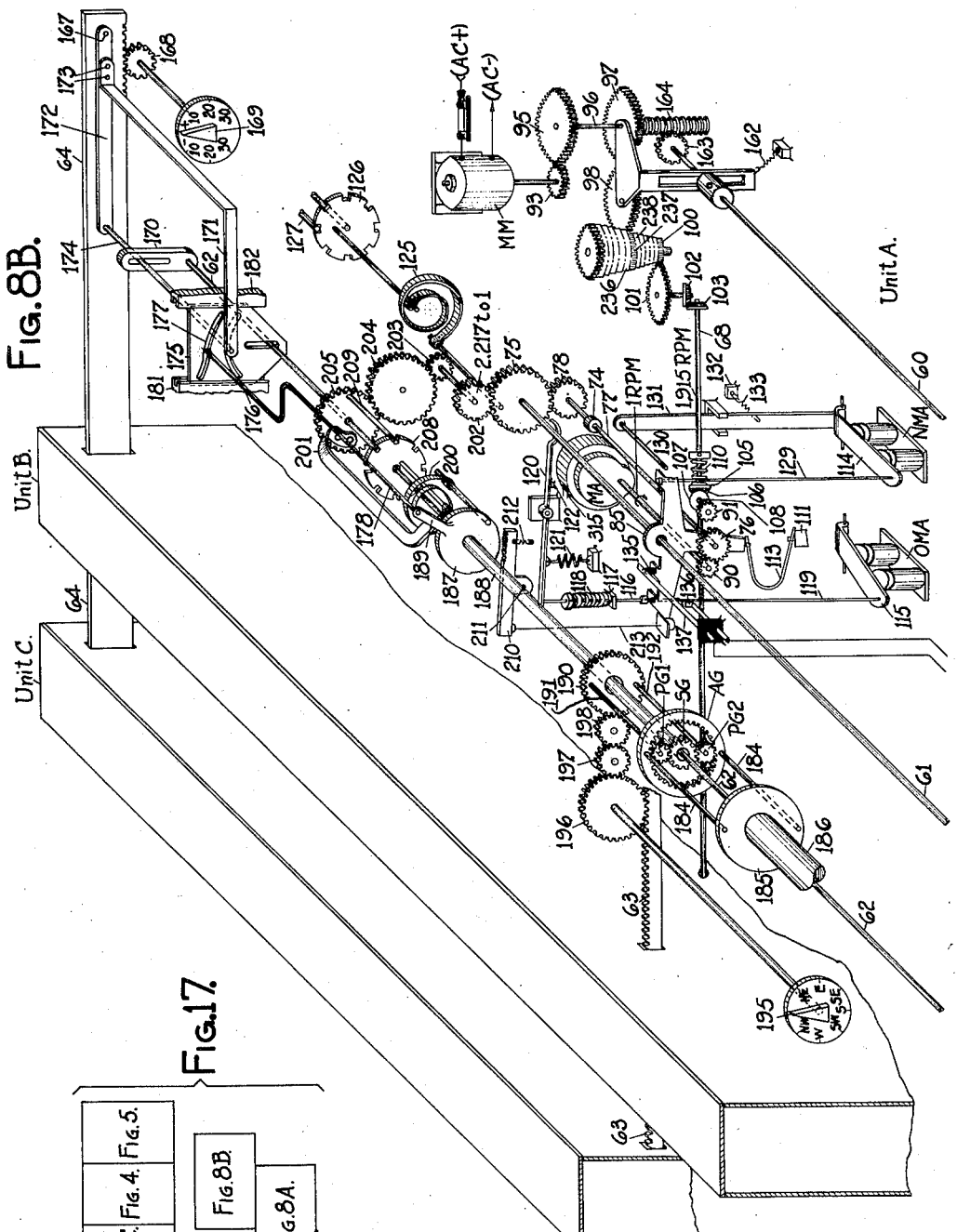

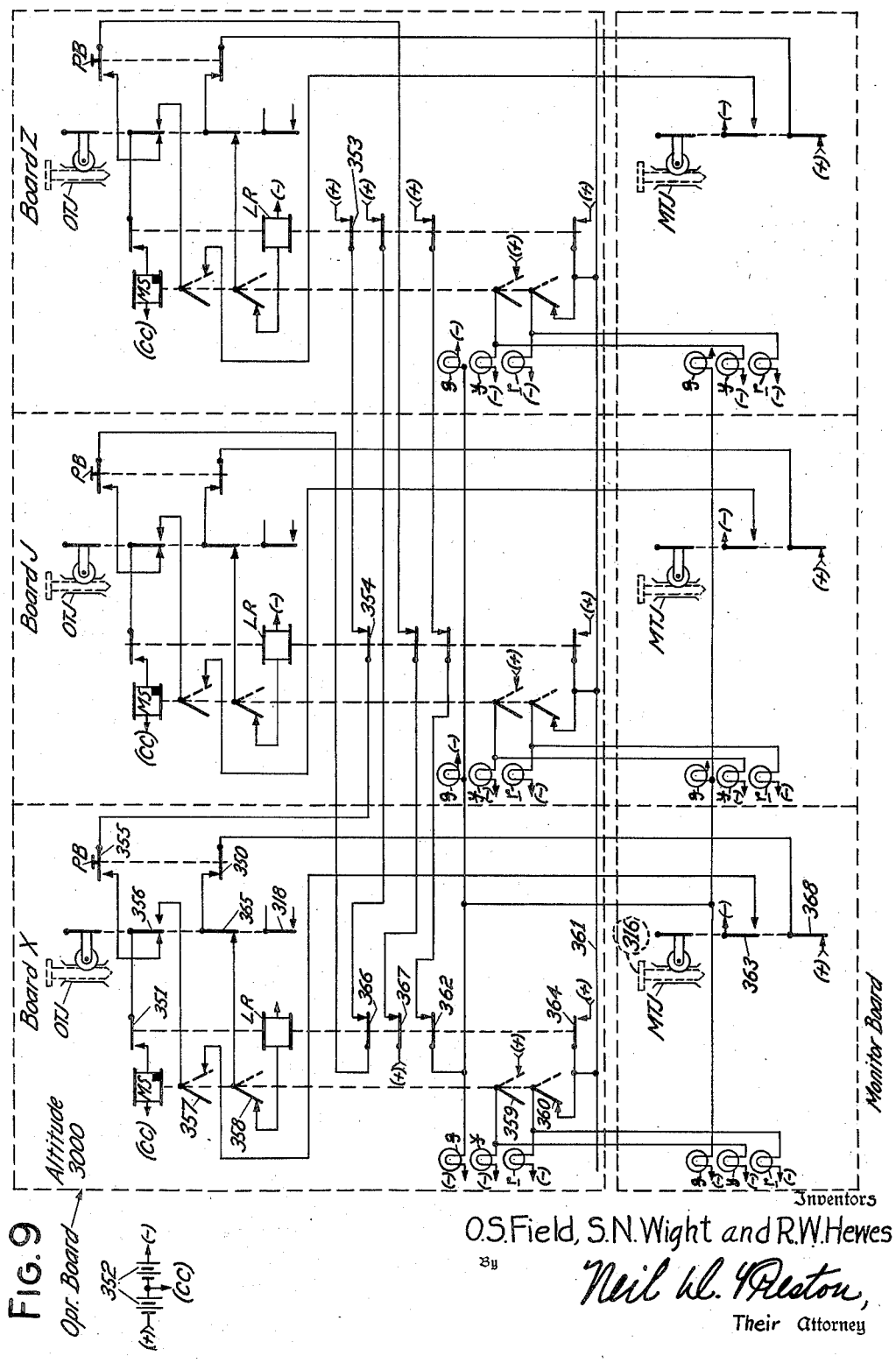

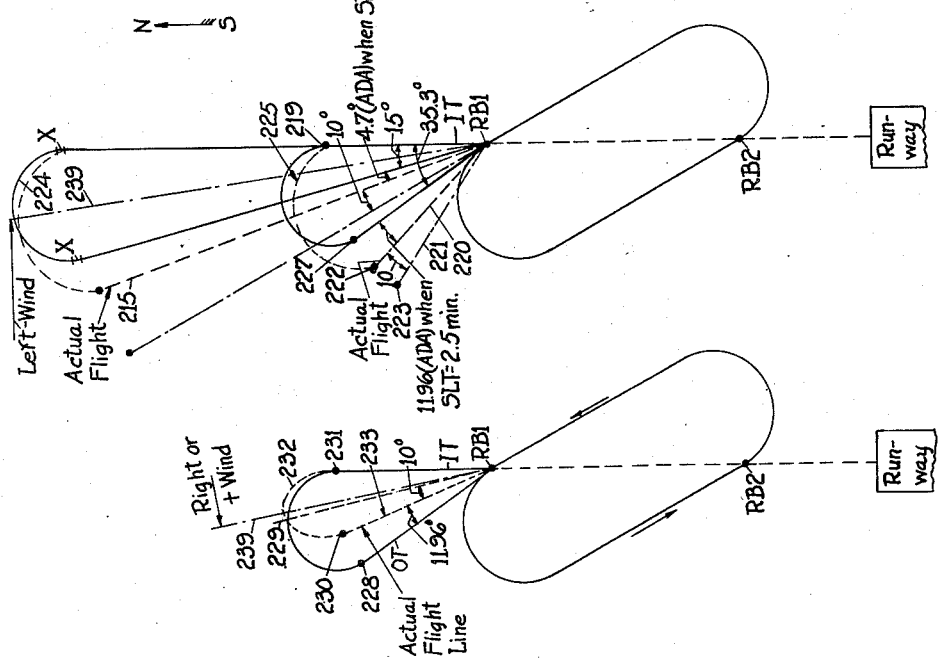

Patented Sept. 12, 1950

2,522,029

UNITED STATES PATENT OFFICE 2,522,029

AIRPLANE APPROACH CONTROL SYSTEM

Oscar S. Field, Sedgwick N. Wight, and Ralph W. Hewes, Rochester, N. Y., assignors to General Railway Signal Company, Rochester, N. Y.

Application January 22, 1945, Serial No. 573,876

35 Claims. (Cl. 177—353)

This invention relates to a control system in which computers or flight predictors are used to compute approximately the time an airplane must consume in flying out into a variable length storage loop in order to get into position to land at a predetermined time; and this invention may be considered an improvement over the method and apparatus disclosed in the prior application of S. P. Saint, Ser. No. 569,335, filed December 22, 1944, now Pat. No. 2,495,139, dated January 17, 1950.

It has been the common practice to store airplanes in one or more storage stacks near an airport, each airplane being assigned to fly in its particular altitude, and to then cause these airplanes to be landed one at a time either directly from its altitude or after it had been laddered down to one of the lowest altitudes. By reason of the fact that the operator or dispatcher who supervises such landing of airplanes from a storage stack does not know, at least under poor visibility, in what part of the flight path in his altitude a particular airplane is flying when its pilot is called to make a landing, it is necessary for this dispatcher to allow sufficient time between the successive calling of airplanes from the holding stack to guard against any possible collision between two airplanes, and it is this unnecessarily long time spacing between airplanes that is to be avoided by the use of the computer and associated apparatus involving the present invention.

In accordance with the present invention, it is therefore proposed to provide a computer which is preferably automatically operated in accordance with the lapse of time as determined by suitable time manifesting means such as an electric motor of either the direct current or alternating current synchronous type to determine the time to be consumed in flying out to the turn point in the holding loop.

Since the present invention contemplates the landing of airplanes in overlapped relationship by calling them from the holding stack in shorter time spaced intervals than the time period allotted to a landing maneuver, it is proposed to provide a computer which consists of a plurality, such as three, computing units which are so interconnected that it guards against the calling of airplanes at shorter spaced time itnervals than a predetermined time interval for which the computer has been designated or adjusted.

In accordance with another object of the present invention it is proposed to direct an airplane either to the right or to the left of a particular line of flight used under no-wind conditions depending upon whether the wind is from the right or from the left respectively, that is, whether the drift angle is plus or minus respectively, and to have this angle automatically indicated by the computer at the instant the dispatcher must inform the pilot as to his procedure in the holding loop.

Also, since both head winds and tail winds will have a bearing on the distance that an airplane is to fly into the holding loop it is proposed, in accordance with another object of the present invention, to have the proposed computer indicate such distance in part dependent upon whether there is a prevailing head wind or tail wind and in part in accordance with the time consumed in the holding stack, these two wind compensating provisions being so constructed that if both a right or left component and a head or tail component are existent simultaneously this computer will indicate both the proper angle at which the pilot is to fly into the holding loop and also the distance he is to travel, expressed in time, before he makes a procedural turn.

Another object of the present invention resides in automatically sounding a so-called peep-peep signal a predetermined time before the pilot is to make a procedural turn so that he will not be entirely caught by surprise.

Another object of the present invention resides in the provision of a number of indicating lamps for indicating when an airplane is in the course of being laddered down from one altitude to another in a holding stack or holding loop and to provide suitable indicating lamps for informing the operator how the computer and manual push button operation is progressing during its computing operation.

Another object of the present invention resides in the provision of tokens, token jacks and indicating lamps for both a dispatcher and a monitor, together with push buttons for the dispatcher, for governing and indicating the progress of the laddering down of airplanes in the holding stack.

Another feature of the present invention resides in the provision of timing means for properly time spacing the availability of the three units of the computer.

More specifically it is proposed to provide a computer which announces, as by the lighting of a lamp, that an airplane shall be called from the holding stack, in the provision that another lamp that manifests that the airplane has actually entered the holding loop, the provision of still another lamp which manifests that the airplane is to make a procedural turn and includes the provision of suitable push buttons operated by the operator at the proper times and which if operated determine the ultimate information predicted by the computer.

Generally speaking, the present disclosure shows a control system using a mechanical computer in combination with other elements to effect the desired results in the control of the airplanes. It is to be understood, however, that the features of the system organization are claimed herein; whereas, the novel computer structure and the interrelationship between the various parts of the computer structure are disclosed and claimed in the divisional application Ser. No. 93,146, filed May 13, 1949, and no claim is intended to be made herein to such subject matter.

Other objects, purposes and characteristic features of the present invention will in part be understood from the accompanying specification and will in part be obvious from the accompanying drawings, in which:

Fig. 5 illustrates timer controlled stick relays controlled in part by the timer illustrated in Fig. 4 and in part by contacts operated by the three units of the computer illustrated in Figs. 8A and 8B;

Figs. 6A, 6B and 6C illustrate the circuits and relays used for controlling the computer illustrated in Figs. 8A and 8B;

Figs. 8A and 8B illustrate the preferred form of a three-unit computer used in connection with the circuits illustrated in Figs. 4, 5, 6A, 6B, 6C, 9 and 10 of the drawings;

Figs. 9 and 10 illustrate the laddering-down circuits controlled by the tokens illustrated in Fig. 7 and by similar tokens located on a monitor's board also conventionally illustrated in Fig. 9 by a dotted rectangle;

Fig. 11 illustrates in detail the multiplying plate 175 constituting part of Fig. 8B of the drawings;

Figs. 12, 13, 14 and 15 illustrate flying patterns under a right wind, a left wind, a head wind and a tail wind, respectively;

Figure 6A:
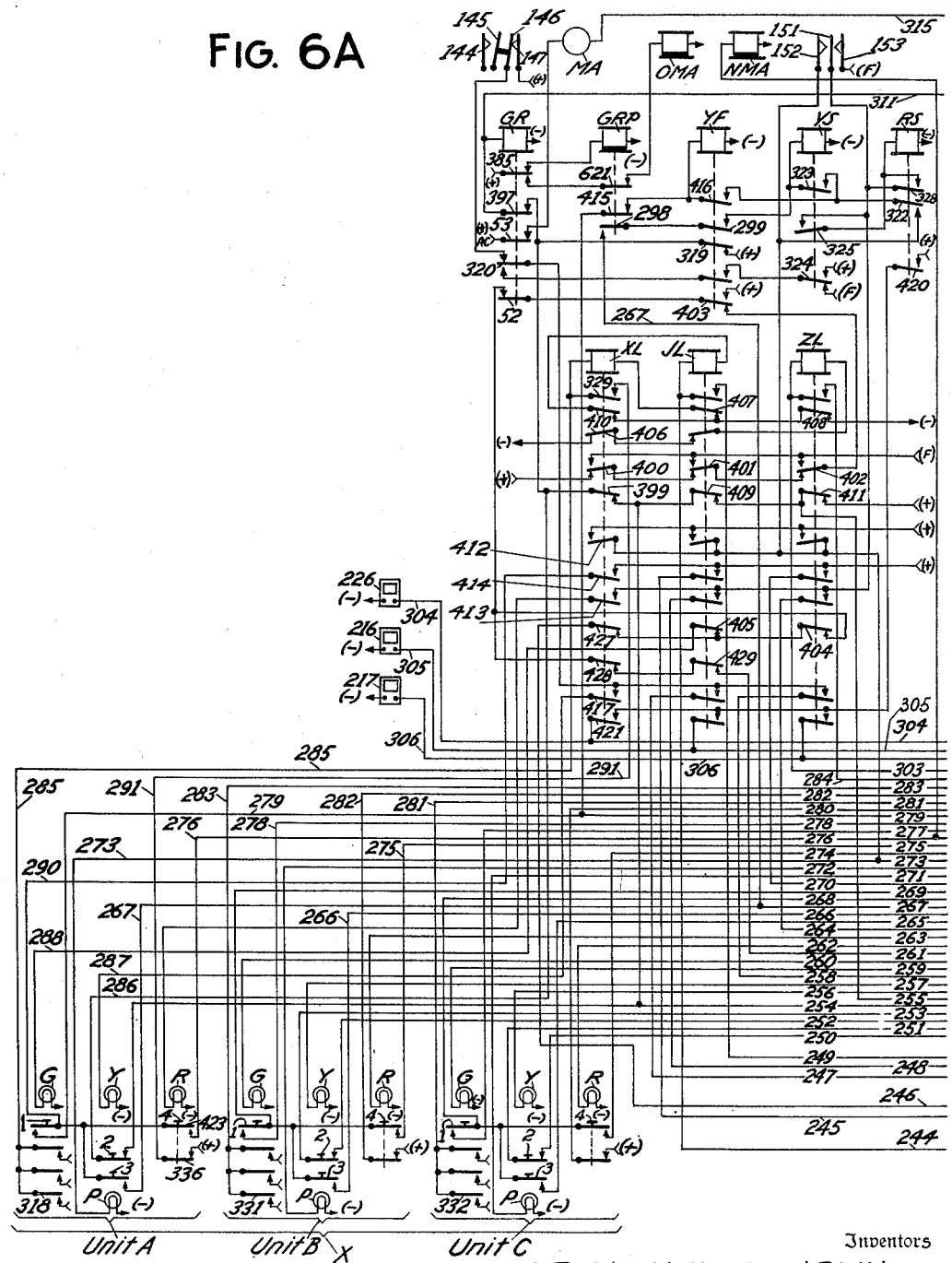
Figure 6B:
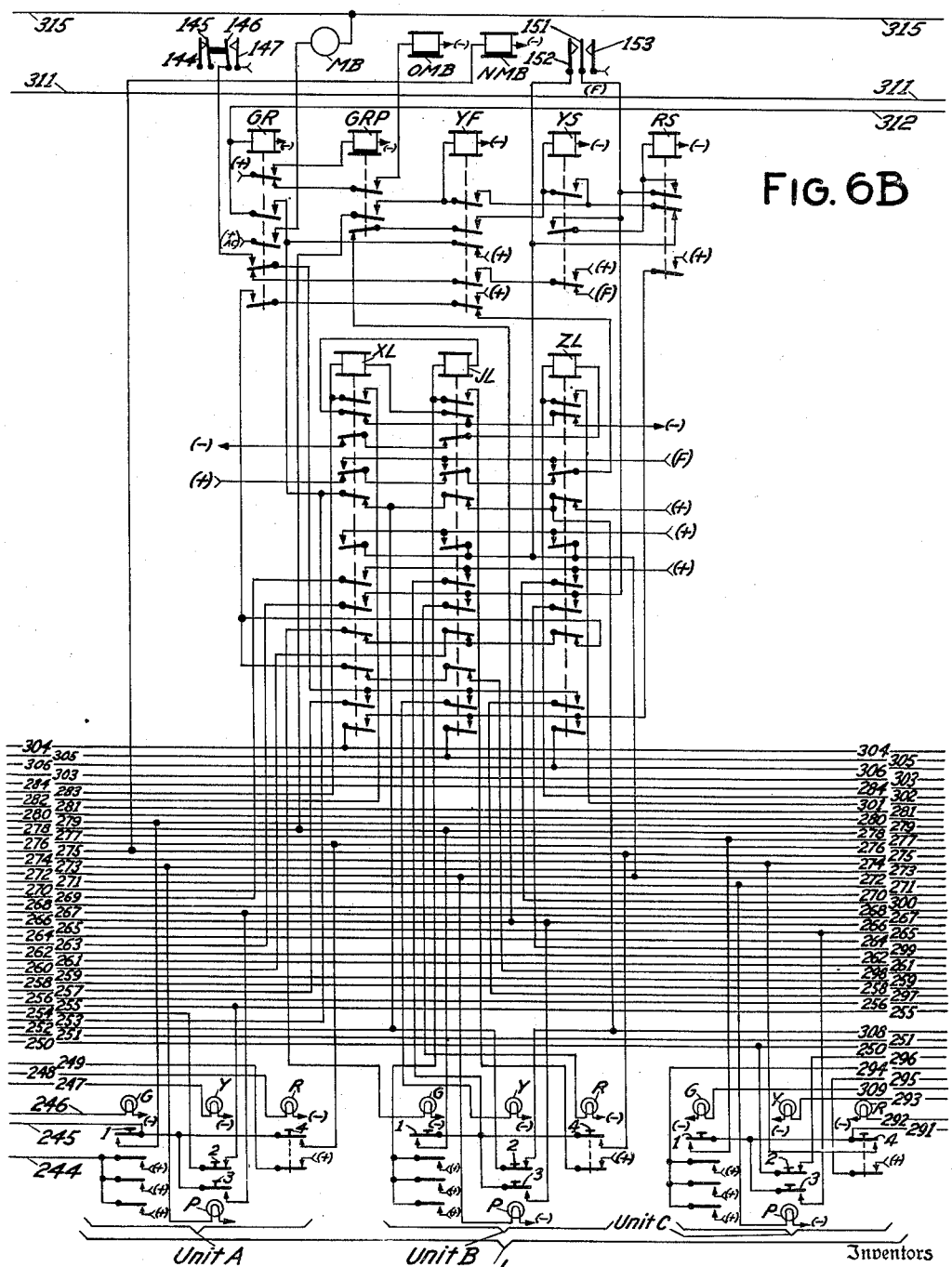
Figure 7:
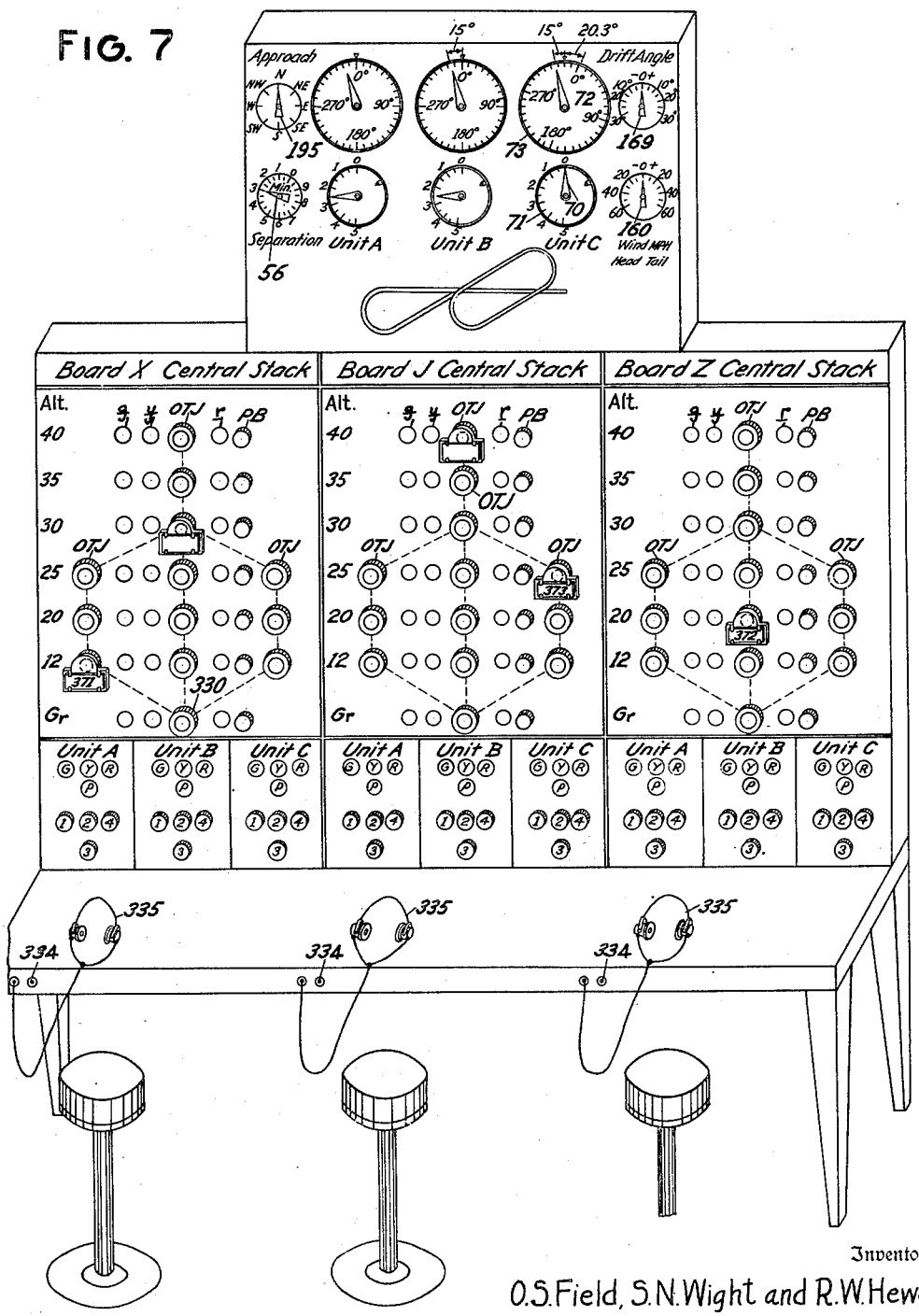
Fig. 7 illustrates three control boards, one for each of three operators each having three small panels one for each unit of the computer, and also illustrates the face of the computer illustrated in Figs. 8A and 8B.

Fig. 13A displays algebraic expressions used in the design of the multiplying plate illustrated in Fig. 11 of the drawings;

Fig. 16 shows the heading angle dials and time dials of Fig. 7 assuming indications in conformity with the normal condition reflected by the circuits illustrated in Figs. 4, 5, 6A, 6B and 6C, namely, with unit A assuming the minimum out-time position;

Fig. 17 shows the relationship between certain sheets of the drawings; and

Fig. 18 illustrates a modified flying pattern in connection with which the present invention may be practiced.

*Holding stack and holding loop.*—By referring to Fig. 1 it will be observed that the two radio beacons or aerophares RB1 and RB2, which are preferably of a construction more fully described hereinafter, are lined up with the glide path for landing airplanes on a runway. This is not a necessary requirement in that the runway could be located a considerable distance away and need not be in a line with these beacons, but it is, however, preferably of a construction as illustrated. From a point above each of these radio beacons RB1 and RB2 the flying path of the storage loop consists of a left-hand semi-circular turn started from such beacon which path upon completion of this turn runs directly into the other radio beacon. In other words, these two radio beacons RB1 and RB2 define a flying path in a holding stack which has one-minute semi-circular turns the ends of which are joined by straight lines each 1.5 minute flying distance in length. These distances are expressed in minutes on the assumption that an airplane travels at, say 135 M. P. H., and from these time values the actual distances can be readily calculated. Airplanes fly in this holding stack path in directions as indicated by the arrows.

If an airplane is called from this holding stack HS1 for the purpose of consuming a variable amount of time in a holding loop such as HL1, depending on his location in the holding stack when he is called, he will if he is flying toward beacon RB2 immediately proceed to make a left-hand one-minute semi-circular turn. If the airplane is located directly over the radio beacon RB2 at the time he is called the time consumed in the stack, conveniently called the stack-loss time, will be one minute consumed during the semi-circular turn and 1.5 minutes consumed during the straight run making a stack-loss time of 2.5 minutes, which is the maximum stack-loss time under no-wind conditions. The holding-loop path is conveniently divided into five parts consisting of a straight run of out-time OT, a circling distance X, a one-minute semi-circular turn CT, another distance X, and an in-time IT. Since the out-time OT and the in-time IT are the same distance (expressed in time) each of a length to consume one minute (for minimum loop) the total time to be consumed in the minimum holding loop, illustrated by dotted lines in Fig. 1, may be readily determined by calculating the two distances X, which are equal, and by adding thereto the out-time of one minute, the in-time of one minute and the semi-circle time of one minute. This calculation of the distance X for minimum out-time, expressed in minutes, can readily be shown to amount to 0.098 minute so that 2X is a distance of 0.196 minute flying distance. The distance X may be calculated as follows: The tangent of the angle X about the center of the circle is the radius divided by OT or 0.318/1 for the minimum out-time of 1, so that the angle is 17°40′ and expressed in radians is 0.3083. Multiplying this by the radius (0.318) we have .098 for X or 2X=0.196.

Figure 1:
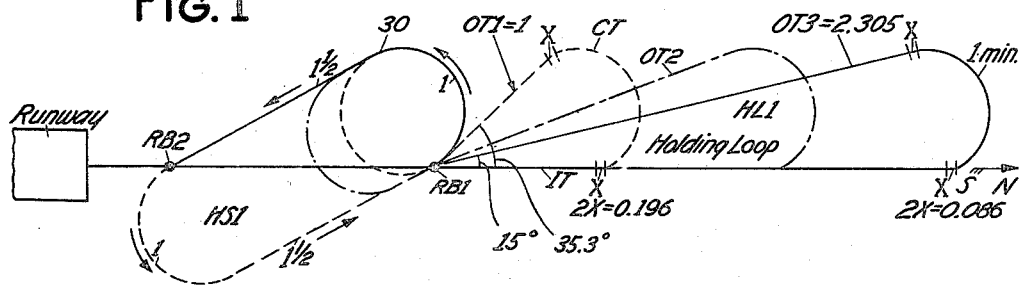
Fig. 1 illustrates a portion of the flying field including a runway and two radio beacons or aerophares showing the flying pattern for the holding stack and the flying pattern of holding loops of various sizes.

By referring to Fig. 1 it will readily be seen that if the stack-loss time is known the holding-loop time can be determined by subtracting the stack-loss time from the total time. It is also readily seen that if the semi-circle time CT of one minute is left out of the computer and since the out-time OT is equal to the in-time IT it would only be necessary to divide 2OT+2X by 2, Since, however, the variable part of 2X varies inversely with the value of 2OT it can readily be seen that if 2OT is divided by a number slightly smaller than 2 the changing value of 2X may readily be compensated for.

By again referring to Fig. 1 and the above calculation of X it is readily seen that for a maximum stack-loss time SLT of 2.5 minutes the out-time OT and the in-time IT will each be one minute and under this condition the value of 2X will be 0.196 minute and the semi-circle time will be one minute. Summing these values up it is readily seen that the total time to be consumed between the calling of an airplane from the holding stack and the time of passing of this airplane over the beacon RB1 when leaving the holding loop will be 5.696 minutes. It is also readily seen that for a minimum stack-loss time SLT (zero) the value of 2X, conveniently called the unvariable part of 2X, will be 0.086 and then the out-time OT will be $$\frac{5.696-1-0.086}{2}$$

or 2.305. It should now be remembered that the purpose of the computer is to compute the heading angle and the out-time OT under various conditions.

Figure 3:
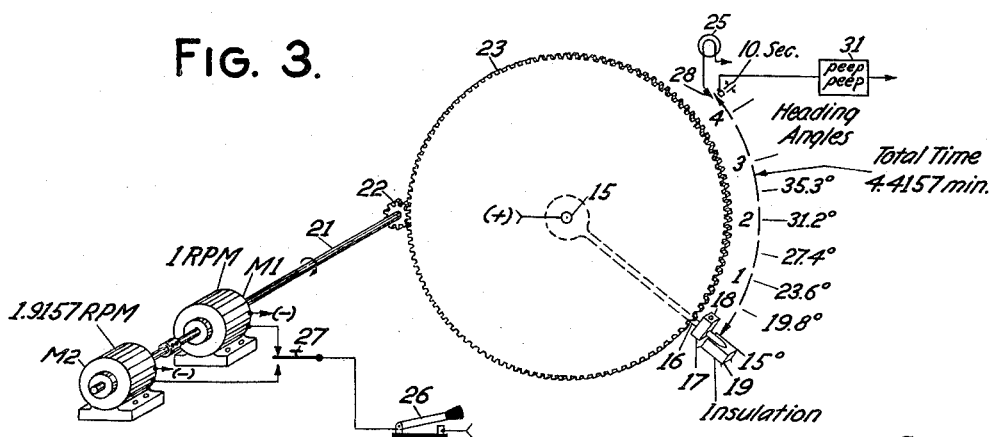
Fig. 3 illustrates a simplified form of computer which may be used under no-wind or substantially no-wind flying conditions.

*Structure—Fig. 3.*—Referring for a moment to Fig. 3 of the drawings, in this drawing has been illustrated a theoretical computing machine which has been illustrated primarily for the purpose of getting a better understanding of the elementary computations that the computer is called upon to make under no wind conditions. In this schematic showing of Fig. 3 a shaft 15, which is connected to one terminal (+) of a suitable source of current, has associated therewith a contact arm 16 which is weighted to its normal position against stop 19 by a weight 17, fastened to this arm 16 by a set screw 18. This arm 16 is provided with a pointer to point out the stack-loss time and the proper heading angle at which the airplane is to fly into the holding loop HL1. This arm is held in its normal position against the stop 19 by gravity acting upon weight 17. This weight 17 is heavy enough to return the apparatus to its normal position in spite of the fact that both of the motors M1 and M2, each of which may include gear reduction, the shaft 21 and the pinion 22 and gear 23 must also be returned to their normal position.

It is readily seen that if the quantity 2X heretofore mentioned were not a factor and if the semi-circle time CT of one minute were omitted from the machine, leaving 4.5 minutes in the computer, it would only be necessary for the motor M2 to divide by two, that is, to have a speed double that of the speed of motor M1 to cause the lamp 25 (Fig. 3) to be lighted when the stack-loss time SLT and the out-time OT have both been consumed. Let us assume for the moment that the portion 2X is disregarded and that the motor M2 has a speed twice that of a speed of the motor M1. Let us also assume that the operator calls an airplane from the stack HS1 of Fig. 1 when it flies directly over the beacon RB2 and that the operator at this time closes the switch 26. The motor M1 will now be operated and cause operation of the shaft 21 at a speed of 1 R. P. M. From this it will be seen that when the airplane reports passing over beacon RB1 a time of 2.5 minutes will have been consumed and the contact arm 16 will have moved a distance signifying 2.5 minutes. As the pilot reports passing over the beacon RB1 the operator will depress the push button 27 to thereby de-energize the motor M1 and energize the motor M2 and under the assumption above made this motor M2 will operate at double speed so that it will grind out, so to speak, the out-time OT and the in-time IT simultaneously so that the arm 16 will engage the contact 28 and cause illumination of the lamp 25 at the expiration of the time OT. Under this condition the total time in the computer would be 4.5 minutes and the out-time OT would be 1 minute.

This computer illustrated in Fig. 3, however, has a total time of 4.4157 minutes for reasons hereinafter pointed out. It is thus seen that under the assumptions just made the motor M1 will grind out, so to speak, the stack-loss time and the motor M2 will operate at twice that speed and will simultaneously grind out both the out-time OT and the in-time IT. Let us now determine what the speed of the motor M2 should be instead of the speed 2 R. P. M. above assumed, to as nearly as possible give consideration to variations in the value of 2X.

As above pointed out for maximum stack-loss time of 2.5 minutes the value of each of OT and IT is one. The value of 2X is 0.196 and the circle time is 1 so that the total time is 5.696. Also, if the stack-loss time is a minimum, namely, 0, then 2X equals 0.086 and OT equals $$\frac{5.696-1-0.086}{2}=2.305$$

If we now take the circle time CT from this total time the total time of the maneuver will be 4.696 but this is not the total time built into the flight predictor, computer or calculator, for the simple reason that the variable part of 2X varies substantially inversely with the value of OT, that is, as OT increases the variable part of 2X decreases, and consideration must be given to the variable portion of 2X. Since we want to use a lower speed ratio than 2 R. P. M. to compensate for variation in 2X we must reduce the total time by a constant which we will call K. If we now consider $g$ to be the speed ratio of the speed of motor M2 to that of the motor M1 we may write out the following equation:

$$OT=\frac{4.5-K-SLT}{g}$$

where 4.5 is the total time in the computer when 2X is disregarded, SLT is the stack-loss time, K is a constant brought into the computer in order to give consideration to the value of 2X, and $g$ is the desired speed ratio or gear ratio, as the case may be, to give consideration to this value 2X. In order to determine the approximate values of K and $g$ we may assume the two extreme limits; first maximum stack-loss time SLT and one minute out-time OT and then the other limit of zero stack-loss time SLT and maximum out-time OT of 2.305. Substituting these values in the equation above we have $$1=\frac{4.5-K-2.5}{g}$$

for the first set of values mentioned and we have $$2.305=\frac{4.5-K}{g}$$

for the second set of values where the stack-loss time is zero. Solving these equations for $g$ we have $$g=\frac{4.5-K-2.5}{1}$$

and from the second situation it also equals $$\frac{4.5-K}{2.305}$$

Solving for K we first get the expression $$\frac{4.5-K-2.5}{1}=\frac{4.5-K}{2.305}$$

multiplying through by 2.305 we get $4.61-2.305K=4.5-K$ or $1.305K=0.11$ or $K=0.0843$ Note that 0.11 is the variable portion of 2X and that 1.305 is the variable portion of OT. Therefore K is the variable portion of X divided by the variable portion of OT.

Substituting the value of $K$ in either of the above equations we have $g=1.9157$. Substituting now the values of both K and $g$ in equation $$OT=\frac{4.5-K-SLT}{g}$$

we have $$OT=\frac{4.4157-SLT}{1.9157}$$

Figure 2:
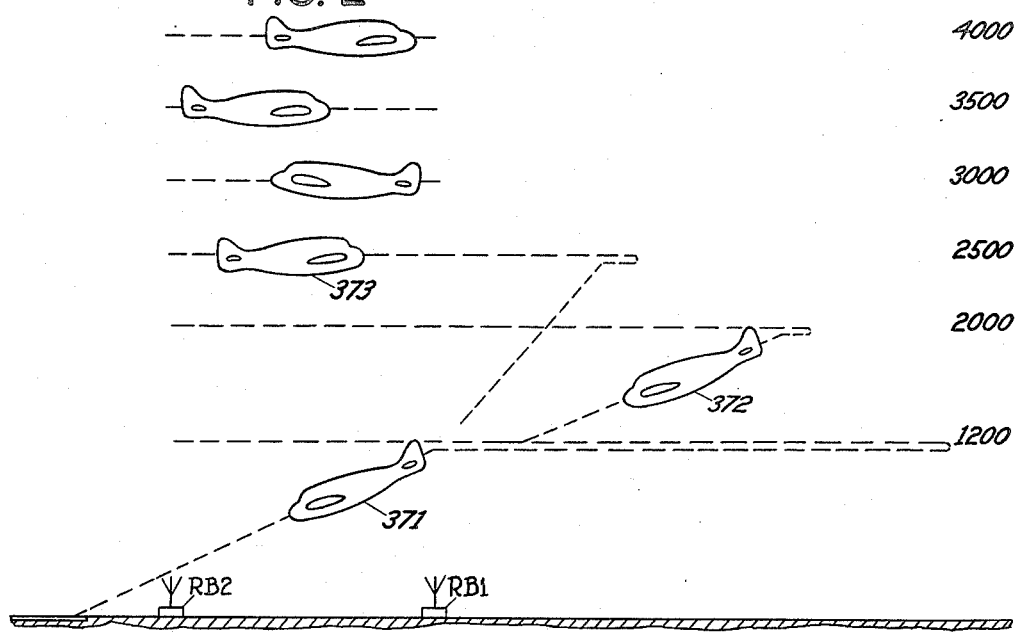
Fig. 2 illustrates a side view of the patterns illustrated in Fig. 1 illustrating airplanes at various altitudes.

From the above considerations and from the structure shown in Fig. 3 we know that the total time in the computer is the stack-loss time SLT plus 1.9157 OT, so that if stack-loss time is 2.5 and OT is one we have a total time in the computer of 4.4157. Also, when stack-loss time is 0 we know that OT is 2.305 so that the time in the computer is $1.9157 \times 2.305$ which also gives us 4.4157. It is therefore readily seen that the total time in the computer is the total actual time of 5.5 minutes minus the one-minute semi-circle time, which was purposely kept out of the computer, minus the value K of 0.0843 leaving a balance of 4.4157 minutes. If we now assume that the speed of the motor M2 shown in Fig. 2 is such as to rotate the shaft 21 at 1.9157 R. P. M. and if the sweep of the contact 16 when driven by the motor M1 requires 4.4157 minutes to light the lamp 25 then the apparatus conventionally illustrated in Fig. 2 will light the lamp 25 substantially when the time OT has been consumed, assuming that the operator closed the switch 26 when the airplane was called from the holding stack HS1 and assuming that he depressed the push button 27 when the pilot reported leaving the holding stack HS1 and entering the holding loop HL1.

Attention is directed to the fact that the total time in the computer is less than the total time between the landing of the airplane and its being called from the holding stack to an extent of minus one, minus the value of K and furthermore that this value K is equal to the variable portion of 2X, namely, 0.11 divided by the variable portion of OT, namely, 1.305. It should be understood that this gear ratio or speed ratio 1.9157 is not exactly correct for all situations and is in fact exactly correct only for the two values of OT used in calculating it. This is true because X varies as the angle under consideration whereas out-time OT varies as the tangent divided by the sine of that angle and these two factors do not vary exactly alike although the discrepancy is very small for small angles.

It will be seen that a scale of heading angles has been provided for the computer of Fig. 3. The particular heading angle to which the pointer points when the pilot reports exiting from the holding stack is the angle read by the operator to the pilot and is the angle the pilot must bear to the left of the beacon line RB2—RB1 in making his holding loop. In practice this will be given in azimuth degrees by subtracting it from 360° for those situations where the holding loop is directly to the north of the landing strip or runway as shown in Fig. 1.

*Operation—Fig. 3.*—Let us now assume that an airplane is at the point 30 in the holding stack when the operator calls him to start a landing procedure and also that he closes the switch 26. The pilot will immediately make a left semi-circular turn and one minute later will be over beacon RB1. The contact arm 16 will have moved a one-minute portion of the total of 4.4157 minutes of the distance to the contact 28, namely, have moved a distance equivalent to 1 minute. The pilot now reports leaving the holding stack HS1 and the operator depresses the push button 27. The operator also reads the heading angle of 23.6° to the pilot as indicated to him by the pointer of arm 16. This stops motor M1 and starts motor M2 and causes shaft 21 to rotate at the new and higher speed of 1.9157 R. P. M. After the motor M2 has operated for an OT time of 3.4157/1.9157, namely, 1.78 minutes the contact 28 closes and lights the lamp 25. The audible signal 31, however, preferably sounds about 10 seconds earlier to give the pilot, as through the medium of the radio, a warning that he is soon to be ordered to make a procedural turn. Subtracting twice the OT time of 1.78 from 5.696 and then subtracting 1 for stack-loss time and 1 for circle time, we have 0.136 minute to cover the 2X distance. From this it will be seen that even though the computer is not 100 per cent accurate it gives substantially correct values and gives them very quickly. Although the computer shown in Fig. 3 was illustrated to show a simple construction embodying some of the computing principles of the present invention it may be considered a modification of the preferred form of computer shown in Figs. 8A and 8B, if desired, and may be used at places where wind is a less significant factor.

*Structure—Figs. 8A and 8B.*—In Figs. 8A and 8B, when laid above each other in staggered relationship, has been illustrated the preferred form of computer embodying the present invention. This computer in addition to the functions performed by the computer illustrated in Fig. 3 substantially accurately determines both the out-time and the heading angle irrespective of head or tail winds and irrespective of side winds. This correction in the heading angle is the angle at which an airplane must head to correct for side drift, which for convenience will be called the drift angle. That is, the computer of Figs. 8A and 8B is provided with one knob to correct for head wind or tail wind and is provided with another knob to correct for the drift angle, and these corrections affect both the heading angle indication and the out-time measurement. Another feature found in the structure illustrated in Figs. 8A and 8B and not found in the Fig. 2 structure resides in the provision of automatic means for increasing the total time consumed between the calling of an airplane from the holding stack and his arrival at the point where he is in a landing position for all head winds, this additional time being dependent upon such head wind and increasing therewith and being automatically set up in the computer in accordance with the position assumed by the head wind and tail wind knob. This latter structure does not give consideration to tail winds in that no such compensation is desirable for tail winds.

Referring to Figs. 8A and 8B of the drawings it will be observed that each unit of a three-unit computer, the units being designated A, B and C, is provided with an out-time shaft 61 and a heading angle shaft 62. A head and tail wind shaft 60 common to the three units is also provided. The heading angle shaft 62 is in part positioned by the rack 64 extending entirely through all three units of the computer. The shaft 60, among other things, is used to operate, as through the medium of cams 165 and 166, the total time rack 65 and the circling drift rack 66, both of which racks extend not only through the unit A shown in detail but also through units B and C of the computer. There is also provided a dividing shaft 68 which extends through all three units of the computer. It may be pointed out here that the units B and C, which have been shown conventionally by oblong boxes, are identical to the unit A illustrated except for the fact that the control knobs 160, 169 and 195 constituting part of unit A are not present in units B and C because the function performed by these knobs are carried into units B and C through the medium of racks 63, 64, 65 and 66 and dividing shaft 68. Since units B and C have been conventionally shown by dotted rectangles only the unit A will be described in detail. In this connection it should be understood that the actual structure used in practicing the invention may depart from the structure shown in many respects in that the structure illustrated has been shown in a manner to illustrate how it functions rather than the exact structure that will be used in practicing the invention. That is, the drawing shows the computer extremely conventionally.

It is considered desirable to describe the stack-loss and out-time section of the computer including shaft 61 first after which the heading section including the heading shaft 62 will be described.

*Out-time selection.*—It may be pointed out here that by reason of the many factors that are involved in determining the out-time, not only is the pointer 70 read on the dial 71 for indicating out-time rotated but the marker 69 which when reached by pointer 70 signifies sounding of the peep-peep signal and also is at times rotated. The dial 71 is stationary and the marker 69 is supported by bracket 157 and has its end bent around the edge of the dial 71 as shown. The heading angle pointer 72 and the heading dial 73 are both rotatable. The stack-loss and out-time pointer 70 is directly driven by the gear 75 which is driven by the idler 76 through the medium of shaft 77 including a flexible coupling 74 and idler 78. The idler 76 is rotatably mounted in a spider 85, which spider is pivoted on the shaft 61 and may be operated to cause the idler gear 76 to engage either the pinion 90, driven by the synchronous motor unit MA, or the pinion 91 driven by the synchronous motor MM. This pinion 91 is not directly driven by the motor MM but is driven thereby through the medium of gear shift means, the dividing shaft 68, and the clutch 105. More specifically, the synchronous motor MM drives this pinion 91 through pinion 93, gear 95, shaft 96, gear 97, idler gear 98, gear 237 of the gear cone 100, idler gear 101, beveled gears 102 and 103, dividing shaft 68, clutch 105, beveled gears 106 and 107 and shaft 108. The plates of the clutch 105 are held in frictional engagement with each other through the medium of the compression spring 110.

It may be pointed out here that the drive pinion 91 under normal, that is, no head-wind or tail-wind conditions, and with gear 98 engaging gear 237, is preferably operated at a speed of 1.9157 R. P. M. whereas the other drive pinion 90 is preferably operated at 1 R. P. M. These speed values are the same as those for the motors M1 and M2 of the Fig. 3 structure. Also, under zero conditions of the computer, namely, before computation has started, the gear 76 operatively engages the drive pinion 90 whereas under out-time measuring conditions this gear 76 is in engagement with the driving pinion 91 driven by the dividing shaft 68. A toggle spring 113 is provided to hold the gear 76 in its last operated position in engagement with one or the other of the driving pinions 90 and 91. The fixed end of this toggle spring 113 is fixedly supported as conventionally shown by the lug 111.

The spider 85 is operated to its out-time position through the medium of the out-time electromagnet OMA and is operated to its normal position through the medium of the normal electromagnet NMA. As illustrated, a certain amount of lost motion is preferably provided in the operating connection between the armature 115 of the electromagnet OMA and the spider 85 as indicated by the fact that the lower end of the rod 116, which is slidably mounted in support 117 and which is urged upwardly by the compression spring 118, does not engage the left end of the spider 85. It may be pointed out that this rod 116 is operated by the armature 115 through the medium of a rod or pull wire 119 passing through a small hole in the left-hand end of spider 85. The upper end of this slide rod 116 engages the lower face of a spring pressed brake arm 120 to hold the other end of this arm 120 out of engagement with the teeth of the gear 75. This brake arm 120 is urged in a direction to cause its toothed end to engage the teeth of this gear 75 by the spring 121, but the force of spring 118 dominates over the force of spring 121. It is readily seen that energization of the magnet OMA will cause the slide rod 116 to be moved down against the force of the spring 118 so as to allow the spring 121 to cause braking of the gear 75 through the medium of the brake arm 120 before this slide rod 116 engages the spider 85 to cause shifting of such spider. If this feature were not provided the gear 75 might be rotated during the process of shifting the spider from its normal position to its out-time position and such rotation is not desirable in that it would result in inaccuracy of computation. It may be pointed out that such rotation of gear 75 would otherwise occur by reason of the fact that this gear 75 is biased in a counter-clockwise direction through the medium of the spiral spring 125. This spiral spring 125 has its one end secured to the gear 75 and has its other end fastened into an adjustable spring barrel 126 which may be held in any one of its various adjusted positions by a pin 127.

As already pointed out the spider 85 may be operated to its normal position through the medium of the electromagnet NMA and wire or pull rod 129. This operation does not, however, take place in one step for the reason that it is desired to provide hesitation in its operation to allow the spiral spring 125 to return shaft 61 and also the gear 76 back to its normal nonoperated position during this movement of the spider 85 from its out-time position to its normal position. In order to cause such hesitation of the spider 85 at an intermediate position, during its return to the normal position, a lock member 130 secured to the arm 131 secured to armature 114 is provided. This arm 131 and this lock member 130 are held in a normal position against a stop 132 by a tension spring 133. If now the spider 85 assumes its abnormal out-time position energization of the electromagnet NMA will cause the lock arm 130 to move under the right-hand end of the spider 85 and will at the same time move the spider to an intermediate position in engagement with this lock member 130. The spider 85 will, however, have been operated slightly beyond its middle position and to a position where the toggle spring 113 is in position to complete the stroke of this spider operation. The toggle spring 113, however, cannot complete this stroke because the lock arm 130 prevents such completion of the operating stroke. After a period of time, the magnet NMA being only momentarily energized, the slow acting feature of this electromagnet NMA will have dissipated the energy in its holding slug, or other retarding means, thereby allowing the spring 133 to withdraw the lock arm 130 from under the right-hand end of the spider 85 and thereby allow the toggle spring 113 to complete the stroke of spider 85.

This spider 85 is provided with an insulated insert 135 which normally holds the contacts 136—137 open. On the shaft 61 and secured thereto is a contact operator 140. As already pointed out the gear 75 and in turn the out-time shaft 61 are biased in a counter-clockwise direction through the medium of the spring 125. It is therefore apparent that a suitable stop should be provided to prevent too much counter-clockwise rotation of this shaft 61. Such a stop engageable by contact operator 140 is provided through the medium of the stop member 141 which is secured to the pinion 142 engaging the rack 65. From this construction it can readily be seen that the operated sliding position of the rack 65 determines the normal position of the shaft 61. This contact operator 140 in addition to comprising part of the stop means also serves to open the contacts 144—145 when the out-time shaft 61 has been operated to a predetermined extent referred to hereinafter as the maximum stack-loss or minimum out-time position. The shaft 61 is provided with a second contact operator 150 which is used for the purpose of first momentarily closing the contacts 151—152, thereafter opening these contacts and closing the contacts 151—153 and thereafter bringing the rotation of shaft 61 to a stop by engaging stop member 156. The exact position assumed by the out-time shaft 61 when such contact operation is performed is determined by the position in space that these contacts 151—153 assume. In this connection it should be observed that these contacts 151—153 as well as the stop member 156 are supported by the pinion 155. This pinion 155 is in engagement with the teeth on the rack 66 so that endwise operation of the rack 66 determines the position assumed by the support which supports contacts 151, 152 and 153 and stop member 156. It may also be pointed out that this pinion 155 supports and at times rotates the marker 69 with respect to the dial 71 on which dial the unused stack-loss time is read through the medium of the indicating pointer 70. This marker 69 points out the location on the dial 71 where the pointer 70 will be when the peep-peep warning signal is started and completed, that is, the width of the marker 69 signifies the duration of the sounding of the peep-peep signal.

As already pointed out the racks 65 and 66 are operated in accordance with the position assumed by the head-wind and tail-wind knob 160, the extent of this movement being dependent upon the shapes of the two cams 165 and 166 which cause such movement. Also, rotation of this knob 160 cannot take place unless the knob 160 is pushed in against the tension of the spring 162. Such pushing of the knob 160 will cause the gear 98 to disengage from the particular cone gear with which it was in engagement and rotation of the knob 160 thereafter will cause corresponding rotation of the toothed pinion 163, the teeth of which are in engagement with the peripheral teeth on the hub 164 of the gear 97. In other words, pushing in of the knob 160 and rotation of this knob, after which the knob will be returned by the spring 162, will cause the gear 98 to engage another gear of the cone 100. The particular gear selected depends upon the direction and extent of rotation of this knob 160. It may be pointed out at this time that the synchronous motor MA, one for each unit of the calculator, is normally disconnected from the source of alternating current whereas the motor MM is preferably continuously connected to a source of alternating current, with the exception, of course, when the computer is not in use.

*Heading angle selection.*—As already pointed out the pointer 72 as well as the associated dial 73 are both operated to determine the heading angle at which the pilot is to head into the holding loop. The pointer 72 is directly connected through the medium of shaft 62 to the slotted crank 170. This slotted crank normally assumes a vertical position, that is, assumes a vertical position when the drift-angle knob 169 assumes a zero position. As already pointed out this drift knob 169 through the medium of pinion 168 controls the endwise movement of the rack 64. It is now desired to point out that this endwise position assumed by the rack 64 determines the initial angular position assumed by the slotted crank 170. This is accomplished through the medium of frame 171—174 which consists of a frame including radius arms 171 and 172 and rivet 174. This frame 171—174 is very rigid and the rivet or pin 174 is moved about the pivot 167 and up and down in the slot of crank arm 170 dependent upon the position it assumes in the slot 176 of plate 175 and the position assumed by this plate 175. The radius arm 172 is preferably so long that the pin 174 moving about pivot 167 moves substantially vertically in the slot of arm 170. The raised position of this plate 175 is determined by the position assumed by the crank pin 178 in the arcuate slot 177 which is dependent on the position assumed by pointer 70. This plate 175 is mounted for up and down sliding movement in channels 181 and 182 all as more fully pointed out hereinafter. The shapes of the arcuate slots 176 and 177 will be more fully discussed hereinafter attention being directed to Fig. 11 of the drawings which shows an accurate front view of one particular form this plate 175 may take.

In order that the dial 73 may be operated accumulatively from two different apparatuses an epicyclic gear train is provided. This epicyclic gear train includes an annular gear AG secured, as by pins 184, to flange 185, which is in turn secured to the dial 73, as through the medium of a hub 186, and includes two planetary gears PG1 and PG2 and the sun gear SG. The sun gear SG is secured to a flange 187, as through the medium of a hub 188. The flange 187 is provided with a crank arm 189 which supports the crank pin 178 heretofore mentioned. The planetary pinions PG1 and PG2 are pivoted on pins 191 and 192 which are in turn supported in the planetary pinion supporting gear 190. This planetary pinion supporting gear 190 is rotated in accordance with the position assumed by the orientation knob 195 as through the medium of gear 196 and idlers 197 and 198. It is thus seen that the dial 73 of the heading angle indicator may be rotated by both the orientation knob 195 and by the crank 189. This crank 189 is biased against the driving member 201 through the medium of the spiral spring 200 and this driving member, during motor operation of the gear 75, is driven in a counter-clockwise direction so that the crank 189 will by action of spring 200 follow the movement of the driving member 201. In this connection it should be noted that this driving member 201 is supported by the gear 205 and that this gear 205 is driven by gear 75 through the medium of idler gears 202, 203 and 204. The spiral spring 200 is anchored between the flange 187 and the anchor plate 208 which anchor plate 208 is adjustably anchored to the gear 205 as through the medium of a lock pin 209.

The flange 187 is preferably provided with very closely spaced narrow and sharp teeth for the purpose of allowing this flange to be locked, as through the medium of the toothed lock member 210, in many different positions. This toothed lock member 210 is preferably pivoted, as indicated, about the pin 211 and is normally urged out of locking engagement with this toothed flange 187 as through the medium of the spring 212. This locking member 210 may be operated against the tension of this spring 212 in accordance with the operation of the spider 85 from its normal to its out-time position as through the medium of a rod or wire 213.

It is thus seen that the dial 73 is moved both in accordance with the rotation of the orientation knob 195 and is also rotated in accordance with the extent of a rotation of the out-time shaft 61 so long as the toothed flange 187 is not locked, namely, in accordance with stack-loss time, and that the pointer 72 is operated initially in accordance with the extent of rotation of the drift knob 169 and is supplementally operated to an extent dependent upon the extent of movement of the pin 178 toward the left in the slot 177 which is also dependent upon the extent of rotation of the shaft 61 in measuring stack-loss time. The extent of downward movement of the plate 175 is dependent upon the extent of rotation of the shaft 61 prior to the time the toothed flange 187 was locked (stack-loss time) in that this flange 187 remains stationary so long as it is locked. Continued rotation of gear 205 is, however, permitted by the yielding action of spiral spring 200. Since downward movement of plate 175 causes downward movement of pin 178 in the slot of crank 170 this crank 170 and the shaft 62 on which it is mounted will be turned if this crank already assumed a slanting position. In fact the slots 176 and 177 in plate 175 are of such shape that the extent of this supplemental rotation of crank 170 is a product of the extent of its initial rotation of shaft 62 from normal by knob 169 (stack-loss time).

*Operation of the computer of Figs. 8A and 8B (no wind).*—Let us assume that the apparatus illustrated in Figs. 8A and 8B is in its normal condition, as illustrated, and that the operator calls an airplane from the stack HS1 (Fig. 1) as he is flying southwardly over the radio beacon RB2. The particular normal condition illustrated, there being three normal conditions, is one where the unit C (see Figs. 7, 8A and 8B) of the computer has been operated to a minimum holding loop position (maximum stack-loss position). That is, a holding loop having an out-time OT of one minute. Obviously other stack sizes and time values may be used. At such minimum loop position for any unit the contacts 144—145 are open (contacts 136—137 having not yet closed) and in so doing remove energy from the timing motor M (Fig. 4) and from the motor MA (Fig. 8B). The circuits shown in Figs. 6A, 6B and 6C and the dials shown in Fig. 16 show the unit A in its minimum out-time position. This calling of the airplane from the holding stack occurs when the green light G of unit A on each of the panels X, J and Z (Figs. 6A and 7) of the calculator become lighted unless the computer already stood in minimum holding loop positiion as is now the case as illustrated by the circuits in Figs. 6A, 6B and 6C. Let us consider the operation, however, with the unit A of the computer in its zero operated position. Simultaneously with such lighting of this green lamp the motor MA (Figs. 6A and 8B) is started operating to cause the pinion 90 to operate at the speed of 1 R. P. M. This simultaneous action is due to picking up of relay GR (Fig. 6A) which controls the lamp G, board X, unit A, through its front contact 52 and motor MA through its front contact 53. The operator, in a suitable tower near the airfield on the ground, also inserts a token identifying that airplane in token jack OTJ for unit A, panel X (Fig. 7), altitude 1200, also designated 317 (Fig. 7) resulting in the closure of contact 318 (Fig. 6A), which results in the picking up of lock relay XL, unit A (Fig. 6A), and in the flashing of green light G, unit A, panel X, and in the lighting of the purple light P for the units A of all three panels X, J and Z (Figs. 6A, 6B, 6C and 7). The operator then depresses push button 1, unit A, panel X (Figs. 6A and 7) which results in the picking up of relay YF, panel A (Fig. 6A), through front contact 415 of relay GRP, which causes the green light G, unit A, panel X to be changed from flashing to steady. This second steady indication obtained through front contact 403 of relay YF is, however, distinctive from the first steady indication in that the associated purple light is also lighted. The relay GR, panel A, remains stuck up through a stick circuit including a normally closed contact of push button 2 and wires 254 and 286, unit A, panel X, its former stick circuit through back contact 319 of its associated relay YF having been broken. The unit A of the computer illustrated in Figs. 8A and 8B now operates to measure the maximum stack-loss time, namely, the time consumed by the airplane flying in the holding stack from beacon RB2 toward beacon RB1 (Fig. 1) of 2.5 minutes.

With the computer of Figs. 8A and 8B in its zero condition the pointer 70 is positioned on the dial 71 to indicate 2.5 minutes which corresponds to the maximum stack-loss time. Since the airplane under consideration was assumed to be over the beacon RB2, when the computer started operating and when the airplane was called from the holding stack, this airplane will consume this maximum stack-loss time of 2.5 minutes by the time it flies over the beacon RBI and leaves the holding stack and the pointer 70 of unit A will indicate zero as it does in Fig. 16.

The gears 76 and 78 (Fig. 8B) are of the same diameter and for the particular construction assumed the gear 75 is of a diameter ten times that of the diameter of pinion 90. With such gear ratios, other gear ratios may obviously be used, the rotation of 2.5 revolutions of pinion 90 (2.5 minutes) will cause gear 75 to rotate ¼ revolution to thereby cause the pointer 70 to indicate zero on the dial 71 at the end of the time consumed by the airplane in the holding stack HSI (Fig. 1) under the condition assumed. As the pilot of the airplane under consideration reports flying over the beacon RBI in the northward direction, that is, as he leaves the holding stack, he reports this event to the operator who reads the heading angle indicated by pointer 72 on dial 73 and then depresses push button 2, unit A, panel X (Figs. 6A and 7) to thereby cause deenergization of the relay GR, unit A, by the opening of the stick circuit for this relay. This causes deenergization of slow dropping repeater relay GRP and also causes the yellow lamp Y, unit A, panel X to flash through a circuit including back contact 320 of this relay GR. It also causes a prolonged momentary energization of the electromagnet OMA (Figs. 6A and 8A) through a circuit including front contact 621 of relay GRP and back contact 385 of relay GR.

Depression of push button 3, unit A, panel X, by the operator in response to the pilot's repeat-back of the heading angle, picks up relay YS which by the lifting of its contact 324 changes the lamp Y, panel X, unit A, from a flashing to a steady light. Relay YS, unit A, is now stuck up through a circuit including back contact 322 of relay RS and its stick contact 323.

This momentary energization of the magnet OMA mentioned above during its initial operation causes the rod 116 (Fig. 8B) to be pulled down to thereby allow the spring 121 to apply the brake 120 away from its stop 122 and against the gear 75, to prevent retrograde operation of this gear due to the tension of the spring 125, this brake 120 being a ratchet brake to prevent only counter-clockwise rotation of gear 75. Continued movement of the armature 115 of the magnet OMA causes the spider 85 to be operated to its out-time position to cause engagement of gear 76 with pinion 91 instead of pinion 90, where it is held by toggle spring 113. Gear shifting having now taken place the gear 75 is now driven at the higher speed through the medium of the out-time pinion, or dividing pinion 91. Dial 73 is however no longer rotated because flange 187 is now held by brake 210; rotation of gear 205 is however permitted by the yielding action of spring 200. This pinion 91, under no-wind condition, operates preferably at a speed of 1.9157 R. P. M. in the particular construction shown. This is true because the shaft 68 operates at this same speed and the bevel gears 106 and 107 have a gear ratio of one to one.

For reasons already pointed out in connection with the simplified computer of Fig. 3 the total time between the 2.5 position on dial 71 and the time that contacts 151—153 are closed is, under no-wind conditions, 4.4157 minutes. Subtracting the stack-loss time of 2.5 minutes from the total time of 4.4157 minutes set up in the computer leaves a difference of time in the computer of 1.9157 minutes. Since the speed of the pinion 91 is 1.9157 R. P. M. it will require just one minute of actual time to cause the contacts 151—153 to close after the pilot has left the holding stack HSI. Or in other words, the out-time OT will be one minute as it should be from considerations given to the flying pattern illustrated in Fig. 1 hereinbefore. This out-time of one minute is, however, not yet of any importance because the pilot is just leaving the holding stack HSI, and it is necessary for the operator, as above pointed out to instruct the pilot at what azimuth he is to fly into the holding loop HLI (Fig. 1).

As already pointed out, in the particular embodiment of the invention illustrated, the pitch diameter of gears 76 and 78 are the same and the pitch diameter of pinion 90 to gear 75 is in the ratio of one to ten, the pinion 91 being of the same diameter as pinion 90. Also, in this particular embodiment of the invention illustrated, the gears 75 and 205 preferably have the same pitch diameter and the pitch diameter ratio of gear 202 to gear 203 is as 2.217 is to 1. This gear ratio is chosen so as to cause rotation of dial 73 an extent equivalent to 20.3° (35.3°–15°, see Fig. 13) during 2.5 minutes of rotation of shaft 61 (maximum stack-loss time) in order to indicate the proper heading angle. Also, the epicyclic gear train used for driving the dial 73 is of a construction such that the pitch diameter of planetary gears PG1 and PG2 are each half the pitch diameter of the sun gear SG, and the internal pitch diameter of the annular gear AG is twice that of the pitch diameter of sun gear SG. In other words, if the planetary pinion supporting gear 190 is held stationary and sun gear SG is rotated then the annular gear AG will rotate in the opposite direction half as fast as does the sun gear SG.

Coming back now to the operation of the computer, it will be remembered that during the time the pilot flew in the holding stack, which was 2.5 minutes, the gear 75 was rotated clockwise by the pinion 90 through ¼ of a revolution, that is, through an angle of 90°. This 90° rotation of gear 75 will cause the gear 205 to rotate counter-clockwise less degrees to the extent of the ratio of the diameters of gears 203 to 202, namely, to an extent of 90° divided by 2.217 or through an angle of 40.6°. Since the dial 73 rotates half as fast as does the gear 205 this dial 73 rotates in a clockwise direction to an extent of 20.3° so that the pointer 72 instead of indicating the original 345° now indicates 324.7°. This is the heading angle that the operator will instruct the pilot of the airplane to fly at as he leaves the holding stack HSI (Fig. 1). This angle defines degrees azimuth and is equivalent to flying to the left of due north to an extent of 35.3°. This angle is the same as the one indicated by the apparatus illustrated in Fig. 3 and is the largest no-wind heading angle.

The pilot will now fly in the direction azimuth 324.7° which is along the line OT1 in Fig. 1 of the drawings. It will be remembered that at the time this angle was read to the pilot the spider 85 was operated from its normal to its out-time position and that the gear 75 is now rotated at a speed of 1.9157 times that of its original speed and that after one minute of operation at this increased speed the shaft 61 will have rotated to an extent to close contacts 151—153. In this connection it will be pointed out that the contacts 151—152 were closed for a period of approximately ten seconds prior to the closing of the contacts 151—153. This prior closing of the contacts 151—152 closes a circuit including these contacts 151—152 (Fig. 6A), front contact 325 of relay YS and winding of relay RS, unit A (Fig. 6A). The picking up of relay RS sounds a so-called peep-peep signal, both directly to the operator and indirectly through the medium of the radio communication apparatus to the pilot on the airplane. The operator's headsets of this radio communication apparatus have been illustrated at 335 in Fig. 7 of the drawings, the microphone receptacles being shown at 334. If desired each operator's set may employ a different carrier frequency so that simultaneous conversations may be carried on by a plurality of operators. This sounding of the peep-peep signal 326 (Fig. 6A) is accompanied by the lighting of the red lamp R, unit A, panel X (Fig. 6A).

Picking up of relay RS, unit A (Fig. 6A), by the opening of its back contact 322 drops the associated relays YF and YS. Dropping of relay YS opens the pick-up circuit for relay RS at its front contact 325. About 10 seconds later contacts 151—152 open and contacts 151—153 close causing the steady red light to change to a flashing red light. Also since this flashing is comparatively slow, say at one second intervals, the relay RS, unit A, will drop at least momentarily and open its stick circuit at its stick contact 328 so that it will remain down. The red lamp R, unit A (Fig. 6A), will keep on flashing due to the flashing energy supplied by contacts 151—153. Also, contacts 52—51—53 are break-before-make and this also assures the dropping of relay RS. Further turning of the shaft 61 will, however, be prevented by reason of contact operator 150 engaging stop 156. No harm will be done in that motor MM will not be stalled by reason of slippage allowed by slip clutch 105—106.

The operator will now momentarily depress push button 4, unit A, panel X, which will, through the medium of wire 276, result in the momentary energization of the normal magnet NMA (Figs. 6A and 8B). Lock relay XL (Fig. 6A) will not drop because the token still holds token contacts 318 (Figs. 6A and 9) closed. This energization of the magnet NMA will cause its armature 114 (Fig. 8B) to be attracted and as it starts moving the spider 85 in a clockwise direction a completion of the movement of the stroke of this spider 85 is prevented by the lock member 130 coming underneath the right-hand end of the spider 85. The spider 85 will, however, have been operated beyond its center position where gear 76 is disengaged from both of the pinions 90 and 91, and the toggle spring 113 will tend to complete the stroke of the spider 85.

As conventionally illustrated the normal magnet NMA is slow dropping and since it is only momentarily energized its armature will be released only after its drop-away period has expired. Such releasing of the armature 114 will, after the spring 125 has returned shaft 61 and pointer 70 to its original position, cause the lock member 130 to disengage from beneath the right-hand end of the spider 85 to thereby allow the toggle spring 113 to complete the stroke of the spider 85 toward its normal position. This hesitation of the spider 85 in an intermediate position allows the spring 125 to return the gear 75 together with all of the gears and pinions connected thereto so that the apparatus again assumes its zero position as illustrated in Figs. 8A and 8B of the drawings.

When the pilot reports clearing altitude 1200, in a direction toward the ground, the operator will remove his token, identifying that airplane, from token jack OTJ at 317 and will insert it in ground defining token jack OTJ at 330. When the airplane has landed the pilot so reports and the operator removes the token from token jack 330. This removes pick-up energy from lock relay XL, unit A (Fig. 6A).

A second momentary depressing of push button 4, unit A, panel X, now opens momentarily the normally closed contact 336 of this push button 4 included in the stick circuit for lock relay XL, unit A, including wire 291 and stick contact 329 of the relay XL. Since removal of the token has opened the pick-up circuit for this relay XL this relay will now drop. Dropping of this relay XL extinguishes the purple lamp P on the unit A panels for each of panels X, J and Z (Figs. 6A, 6B, 6C and 7). All of the lamps and all of the computer apparatus have now been restored to their normal conditions except that possibly now unit B of the computer has been operated to the minimum loop position where contacts 144—145 of this unit open and stop all of the motors M, MA, MB and MC. For reasons pointed out hereinafter a monitor must also move his token on his board (see Fig. 9) to properly control the lights on the token board X (Fig. 7).

*Operation—Figs. 8A and 8B (left wind).*—Since the effect of the west wind will be such that when an airplane is flying northwardly it will have to point its nose to the left of north in order to compensate for such wind the drift angle due to a west wind will be called a minus drift angle and if we assume that this west wind is such as to result in a drift angle of 10° the operator will turn his drift-angle knob 169 to the position —10°. Such movement of knob 169 (Fig. 8B) will cause counterclockwise rotation of pinion 168 and will cause the rack 164 to be moved to the left to an extent that the slotted crank 170 and pointer 72 assume substantially a position 14.7° to the left of normal. This will in turn cause the pointer 72 to indicate 330.3° azimuth instead of the normal 345° azimuth position (Fig. 7). This is the proper position for pointer 72 under the assumed wind condition and zero stack-loss time.

Let us now assume that the operator calls an airplane from the holding stack HS1 (Fig. 1) in response to the lighting of the green lamp G, unit A, panel X (Figs. 6A and 7), just as the airplane is flying over the radio beacon RB2. By reason of the fact that this west wind will have very little effect on the speed of the airplane while in the holding stack the airplane will arrive over the beacon RB1 substantially 2.5 minutes after the computer unit A of Figs. 8A and 8B was initiated. During this 2.5 minutes of operation of the gear 75, through the medium of the pinion 90, this gear 75 (Fig. 8B), will have rotated through an angle of substantially 90° in a clockwise direction, and in turn will have caused counterclockwise rotation of the gear 255 to an extent of 40.6°. As a result of this operation the crank pin 178 moves counter-clockwise in the slot 177 of the multiplying plate 175 to an extent of 40.6°. This movement of the crank pin 178 in slot 177 will cause downward movement of the multiplying plate 175 as is apparent from the shape of this slot 177 (see Fig. 11). This multiplying plate 175 also moved downwardly to the same extent during the particular operation of this apparatus heretofore considered but in that case the slotted crank 170 was in a vertical position and the downward movement of the rivet 174 did not produce any turning of the crank 170. In the present instance, however, this rivet 174 is not directly over the shaft 62 and its substantial vertical movement downwardly will cause additionally counter-clockwise rotation of the slotted crank 170.

As above pointed out the turning of the drift knob 169 to the —10° position caused the slotted crank 170 to be moved substantially 14.7°. The difference between the two angles, namely 4.7°, is the angle necessary to compensate for circle time of 1.086 minutes for zero stack-loss time, leaving an out-time OT of 2.305 minutes, for a 10° drift angle. This difference is conveniently called the additional drift angle ADA which is equal to circle time (CT) times the drift angle D° divided by out-time OT (Fig. 13A). Under the assumed condition this means $$ADA = 1.086/2.305 D°$$

and if $D° = 10°$ then $ADA = 4.7°$. This is the condition for zero stack-loss time and an out-time OT of 2.305 minutes. For maximum stack-loss time of 2.5 minutes (OT=1 minute) we have $ADA = 1.196/1 D°$ and if $D° = 10°$ then $ADA = 11.96°$. In other words the shape of the slot 177 in multiplying plate 175 (Fig. 11) is such that 40.6° rotation of crank pin 178 in this slot 177 causes the plate 175 to move down a distance to cause rivet 174 in the slot of crank 170 to move this crank an additional angle of 7.26°, namely 11.96°—4.7°, so that this crank 170 now assumes the 21.96° position. That is the total drift correction (21.96°) is to the drift angle (10°) as the sum of out-time (1) and circle time (1.196) is to the out-time (1). That is, total drift correction is 2.196/1 times 10° or 21.96°. During this 40.6° rotation of crank pin 178 the dial 73 is rotated 20.3° from the 15° position to the 35.3° position. These various angles as well as the various out-times and flight lines have been clearly illustrated in Fig. 13 of the drawings. In Fig. 13 the dotted line 225 illustrates the approximate paths the airplane under consideration would take when flying its circle time, whereas the dotted line 224 indicates the path it would have followed had the stack-loss time been zero. It is thus seen that the portion of the added drift angle ADA above its initial 0.47D° position (set by hand) varies with the stack-loss time and is increased as stack-loss time elapses. As pointed out, however, the pilot has been instructed to fly in the direction indicated by the dot and dash out-time line 221 (assuming stack-loss time of 2.5 minutes) and by reason of the drifting during the flying of the out-time he will arrive at the point 222 instead of the point 223 constituting the end of the dot and dash line 221. The distance between the points 222 and 227 (Fig. 13) is equal to the extent that the airplane will drift during the one plus 2X minute semi-circle turn time, so that the actual path that the airplane will take in flying the distance OT is indicated by line 220 and the actual path the airplane will follow when making this one plus 2X minute semi-circular turn is that indicated by the dotted line 225. The airplane will therefore arrive at the point 219 which is at the end of the in-time line IT. The values of the out-time as illustrated by the dot and dash line 220 will be substantially one minute, the same as it was under no-wind condition, as is also true of the length of the in-time line IT, both of which are substantially one minute distances. The solid lines of Fig. 13 show the actual path in minutes the airplane would have flown under 2.5 minute stack-loss no-wind conditions, whereas the dotted lines 220 and 225 show the actual path under the 2.5 stack-loss —10° drift condition and dotted lines 215 and 214 show the actual path under zero stack-loss —10° drift conditions.

The conditions for a —10° drift angle under the two extreme stack-loss conditions of zero minutes and 2.5 minutes just discussed and illustrated in Fig. 13 can be accurately designed into the computer whereas all of the intermediate values of additional drift angle are only approximately correct by reason of the fact that two variables, namely, the drift knob position and the stack-loss time cannot be both accurately taken into consideration by a single curved slot. The results obtained are, however, so nearly accurate that the errors are negligible compared with instantaneous changes in wind conditions, and the like, that are encountered in practice.

*Operation—Figs. 8A and 8B (right wind).—* Since an airplane flying northwardly must head toward the right to compensate for an east wind this east wind will be defined as a plus drift angle and the drift-angle knob 169 will be turned to the right to the +10° position, in that it is assumed that this east wind is of a velocity to require a 10° drift correction to compensate during out-time flying. Let us now assume that an airplane is called from a holding stack HS1 (Fig. 1) just as he is flying southwardly over the radio beacon RB2 and that the unit A of the computer shown in Figs. 8A and 8B starts at the time the airplane is called from the holding stack. The airplane will not be affected to any appreciable extent in the holding stack by the east wind in that the beacons will guide the pilot in properly maneuvering the airplane over the holding stack path and the airplane will reach the beacon RB1 substantially 2.5 minutes after he has been called. During this 2.5 minutes stack-loss time the gear 205 will be rotated in a counter-clockwise direction to an extent of 40.6° and in so doing will cause the same angular movement of the crank 189 and the crank pin 178 in the slot 177 of the multiplying plate 175 as heretofore. This angular movement is of the same extent as in the operation just considered so that the multiplying plate 175 is moved downwardly to the same extent. In this connection, however, the slotted crank 170 already assumed a position 14.7° clockwise from its normal vertical position and the downward movement of the multiplying plate 175 will cause additional clockwise rotation of the crank 170 and the shaft 62 to which it is connected, so that in this case the heading angle is larger than the no-wind heading angle of 324.7° azimuth (the angle to left of due north is smaller) to an extent of 14.7+7.16° or 21.96° making a total of 346.66° azimuth so that the pointer now reads 346.66° on the dial 73. The no-wind factor of 35.3° is obtained by rotation of dial 73 through an angle of 20.3° added to the normal indication of 15° and the wind correcting factor of 21.96° is obtained by rotation of pointer 72.

Referring now to Fig. 12 of the drawings the drift angle correction which was effected by the turning of the knob 169 to an extent of +10° and the shaft 62 to an extent of +14.7° has not been shown in Fig. 12 in that its relationship would have to be shown in connection with an out-time line of 2.305 minutes. In Fig. 12 as the pilot heads out on the dot-and-dash line 229 he will actually follow the dotted line 233 and finish at the point 230. This is true because the airplane drifts westward to the extent of the drift angle of +10°. This line 229 is, however, not 10° clockwise from the regular out-time line OT but is 21.96° clockwise of this line OT. This latter angle was determined by the computer exactly in the same manner as the 21.96° angle was determined under the preceding discussion. The heading compensation in this case is, however, in a clockwise direction whereas in the former case it was in a counter-clockwise direction. The reason for this is that the initial movement of crank 170 was in the opposite direction and the supplemental effect caused by stack-loss time consummation moving the multiplying plate 175 downward merely exaggerated this initial movement. As the pilot proceeds to make his 1+2X minute semi-circular turn from point 230 and flying in the drifting air he will follow substantially the dotted line 232 and finish on the in-time line directly on the line of beacons RB1 and RB2.

The real purpose for computing the heading angle rather accurately is to land the airplane as near as possible on the in-time line IT so that the pilot will have an opportunity to check his bearings on both radio beacons RB1 and RB2 before reaching the beacon RB1. This desirable in order that the pilot may himself discover his heading angle into the side wind so that he may thereafter quite accurately follow the beacon line.

In most of the foregoing assumptions the airplane was assumed to be flying over beacon RB2 when it was called from the holding stack. It is of course understood that in practice this would very seldom occur and that the airplane may be anywhere in the holding stack when it is called and that the stack-loss time may be anywhere from zero to 2.5 minutes under no-wind conditions. It is also clear that the computer is so built that under no-wind conditions for any stack-loss time SLT the out-time OT is 4.4157—SLT/1.9157 and that this out-time will be semi-automatically computed substantially accurately. This degree of accuracy is also true under various wind conditions. It is therefore not necessary to consider the operation under other stack-loss conditions.

*Multiplying plate.*—The additional angular movement ADA of shaft 62 mentioned under the heading "Operation—Figs. 8A and 8B"; "operation left wind" and "operation right wind" is accomplished by multiplying the drift angle movement for an out-time of 2.305 minutes (see Fig. 1) of slotted crank 170 by the stack-loss time through the medium of the multiplying plate 175 (Figs. 8B and 11) and the rotation of gear 205. As shown in Fig. 11 the lower slot 176 in plate 175 is circular, its radius being 1.535 inches and its center being 0.09 inch below the axis of shaft 62 when the computer unit is in its zero no-wind position. The slot 177 is also made up of two circular portions but of larger radius of curvature. The portion of the slot 177 to the right of point 183 has its center of curvature at a point 0.808 inch to the left and 0.977 inch below the shaft 62 during the zero position of the computer unit under no-wind condition and its radius of curvature is 3⅛ inches. The portion of the slot 177 to the left of point 183 has an inverse curvature the radius of curvature of which is 4 inches and its center of curvature lies above the slot 177 and at a point such that the two centers of curvature and the point 183 are in a straight line. In other words, the two curves of slot 177 are tangent at the point 183. The crank 178 is in the zero position of the computer unit under no-wind conditions as shown, located at a point in the slot 177 directly over the shaft 62, as shown, and the rivet 174 is normally in the middle of slot 176 and directly over shaft 62, as shown. The angle through which crank 178 may move toward the right or toward the left from normal is such that its tangent is 1.075/2 and the radius of this crank 178 is 2 inches. It is readily seen that the extent of downward movement of plate 175 is dependent on the extent of rotation of crank 178 (stack-loss time SLT) and that downward movement of crank 178 will cause previous movement (drift angle) of slotted crank 170 to be exaggerated in proportion to its initial movement and the ultimate heading angle indicated will be substantially such as above pointed out in connection with Figs. 12 and 13 of the drawings. These specific dimensions are not essential but are merely given to illustrate one specific embodiment of this multiplying plate. Other constructions whereby computed results of similar accuracy are obtained may of course be used in place of the specific multiplying plate and its associated apparatus shown and described, these specific dimensions having been resorted to only for the purpose of disclosing one form of means for performing the computing function.

*Operation—Figs. 8A and 8B (tail wind).*—Let us now assume that the unit A of the computer illustrated in Figs. 8A and 8B of the drawings is in its normal condition except that the head-wind and tail-wind knob 160 assumes its +10 M. P. H. position which means that there is a tail wind of 10 miles per hour for north-bound flying. It will be observed that the extent of rotation of the head-wind and tail-wind knob 160 in a clockwise direction will cause a gear shift between the gear 88 and the gears of the gear cone 109 and that the rack 66 will be moved toward the right whereas the rack 65 will not be moved at all because the lower half of the cam 165 is concentric. The peep-peep marker 69 will now be 1.8247 minutes to the right of the zero mark on stationary dial 70 instead of 1.9157 minutes as heretofore.

It is readily seen by referring to Fig. 14 of the drawings that a tail wind, for northward flying, will possibly cause the stack-loss time to be less than it otherwise would be, but for reasons heretofore explained it is unimportant how or why stack-loss takes place in that the computer will compute properly and the same irrespective of the reason for the particular stack-loss time. That is, it is only the extent of the stack-loss time that is important and not why it came about. If, therefore, the stack-loss time is actually less than it would be without such a tail wind the computer will operate to compensate for the stack-loss. This is, however, not true as to the effect that a tail wind will have while an airplane is flying in the holding loop HL1 (See Figs. 1 and 14). It is readily understood that in case of a tail wind the out-time OT will be less in that the velocity of the wind will be added to the air speed of the airplane making the ground speed greater and that the in-time IT will be greater for the reason that the tail wind for northbound flying becomes a head wind for southbound flying making the ground speed smaller. This shorter out-time has been shown in Fig. 14 by the dotted line OT whereas the longer in-time has been illustrated by the dotted line IT.

It will also be observed that the tail wind will cause a similar and exaggerated discrepancy between the out-time OT and the in-time IT due to such tail wind acting upon the airplane while it makes its one-minute plus 2X semi-circular turn and this is illustrated by the lopsided dotted curve 235. The effect of the tail wind acting upon the airplane while making its semi-circular or one-minute plus 2X turn 235 is compensated for by the effect produced by cam 166 (Fig. 8A) acting on rack 66 and against the compression of spring 241; whereas the difference between the out-time OT and the in-time IT, illustrated conventionally by dotted lines in Fig. 14 of the drawings, is compensated for by the change in speed of the pinion 91 effected by shifting the gear 98 to a different part of the cone gear 100, namely, by shifting it from gear 237 to gear 238. It is readily understood from Fig. 14 of the drawings that the out-time OT will be much shorter for which reason the speed of the pinion 91 must be increased and for this reason the gear cone 100 must be an inverted cone, that is, must have its smallest gear at the bottom and its largest gear at the top because the rotation of the head-wind and tail-wind knob 160 in a clockwise direction causes the gears 97 and 98 to be moved downwardly to engage a smaller gear 238 of the gear cone 100. The extent to which the out-time OT has been decreased by reason of the assumed tail wind of 10 M. P. H. acting while it makes its semi-circular turn is compensated for by the cam 166. This cam allows the rack 66 to be moved toward the right by spring 241 thereby reducing the total time set up in the computer to the extent that this cam 166 causes the contacts 151—153 together with their mounting and the stop 156 to be moved in a counter-clockwise direction to cause earlier closing of contacts 151—152 and earlier sounding of the peep-peep signal as will also be indicated by the shifted position of peep-peep signal marker 69.

Coming back to the operation under tail-wind conditions as above assumed we may assume that by reason of this tail wind the stack-loss time will be 2 minutes instead of the 2.5 minutes which would otherwise have been the case. The pinion 90 will therefore rotate two complete revolutions while the stack-loss time is being consumed. During this time the gear 75 will rotate ⅕ of a revolution or 72° in that the speed ratio from pinion 90 to gear 75 is 10 to 1. The gear 205 will therefore rotate 72/2.217 or 32.2° in a counter-clockwise direction so that the dial 73 will move clockwise through an angle of 16.1° and the pointer 72 will indicate 328.9° instead of the original 345° azimuth angle or the angle 324.7° azimuth that would have been indicated under no-wind and one minute out-time condition. This heading angle will then be transmitted from the operator to the pilot of the airplane via radio-phone and the pilot will fly in the direction of the line OT (Fig. 14). It is of course understood that the slotted crank 170 is now in its vertical position and the effect of the multiplying plate 175 in moving downwardly will produce no change in the reading of the pointer 72 on dial 73.

As just pointed out the gear 75 will rotate in a clockwise direction through an angle of 72° during the two minute stack-loss time which was spent by the pilot in the holding stack. This 72° of rotation of the pointer 70 on dial 71 in a clockwise direction represents 72/360 of 2.5 minutes or 2 minutes, and the reading is 0.5 minute when the airplane leaves the holding stack. The extent to which the marker 69 was rotated will be pointed out hereinafter. The operator will, however, as the pilot reports leaving the holding stack, inform the pilot that he is to fly at the angle 328.9° azimuth heretofore mentioned and will at the same time depress push button 2, unit A, panel X (Fig. 6A) to cause shifting of the spider 85 from its normal stack-loss position to its out-time position. The pinion 91 does not now operate at the speed of 1.1957 R. P. M. which it did heretofore but now operates at a higher speed in that the northbound ground speed is higher. This is accomplished by the gear 98 engaging the gear 238 instead of the gear 237, which it engaged heretofore, and the pinion 91 will therefore operate at 2.06 R. P. M. instead of its former speed of 1.9157 R. P. M. because the pitch diameters of gears 238 and 237 are in the ratio of 135 to 145 (ratio of northbound ground speeds).

Since the variations in the value of 2X are negligible insofar as drift of the airplane during circling is concerned a value of 0.15 for 2X will be taken as an average value for circling drift calculation. The turn time is therefore assumed to be 1.15 minutes. During this turn time the airplane will drift northward a distance of 11.5/60 or 0.191 mile. Time must be reserved to the airplane to fly back that additional distance during the in-time flying stretch during which flying it flies against a 10 M. P. H. head wind (flying southward) and its ground speed is only 125 M. P. H. or 2.09 M. P. M. This reserve time of 0.191/2.09 or 0.091 minute, indicated by the tilt in the line 235 (Fig. 14), must be excluded from the total time of 4.4157 minutes in the computer so that the net time in the computer is now 4.3247 minutes. The cam 166 is of such shape that in the position +10 of knob 160 (Fig. 8A) the rack 66 is moved to the right a distance to turn gear 155 counter-clockwise 2.73° equivalent to 0.091 minute. For all other positions of cam 166 and knob 160 corresponding deductions or additions to the time in the computer are made. With a total time of 4.3247 minutes in the computer and with a 2 minute stack-loss time, as above assumed, the time remaining in the computer at the time the airplane leaves the holding stack is 2.3247 minutes. With gear 91 rotating at a speed of 2.06 R. P. M., instead of its former speed of 1.9157 R. P. M., the out-time OT will be 2.3247/2.06 or 1.13 minutes. Under no-wind conditions and with a stack-loss time of 2 minutes the out-time OT would have been 1.26 minutes. It is thus seen that a tail wind reduces the out-time OT.

Let us now see how closely the total time consumed in accordance with the operation of the computer checks with the total time contemplated, namely, 5.696 minutes. The various times consumed were as follows: 2 minutes stack-loss time, 1.13 minutes out-time OT, 1.174 minutes turn time (2/2.5 times 0.11+.086=0.174), 145/125×1.13 or 1.31 minutes in-time IT (not including semi-circle drift in-time portion) and the semi-circle drift time portion of 0.091 minute making a total of 5.705 minutes. The discrepancy, it will be seen, is only 0.009 minute. About ten seconds before the computer reaches its ultimate position the peep-peep signal 226 (Fig. 6A) is sounded through the medium of the contacts 151—152 and this will put the pilot on his alert so that he will be prepared to make his turn when the operator informs him to do so in response to the flashing of the red lamp R, unit A, due to closure of contacts 151—153.

*Operation—Figs. 8A and 8B (head wind).*—A situation where a head wind of say 10 M. P. H. is involved has been conventionally illustrated in Fig. 15 of the drawings and it will be observed from the dotted lines that in this case the out-time OT is longer than is the in-time IT. The solid line storage loop pattern in Fig. 15 shows the various distances expressed in time under no-wind conditions. In this case the total time in the computer is not decreased but is increased and for two reasons. First the total time in the computer has been increased at the finish end of the operation of the computer as determined by the position assumed by the stop member 156 (Fig. 8A) to compensate for the distance the airplane drifts during the average turn time of 1.15 minutes which is accomplished by cam 166; and secondly the total time in the computer has been increased at the start end of the operation of the computer as determined by the variable position of stop member 141 (Fig. 8A) attained by cam 165 to allow for additional stack-loss time in that the head wind may cause the stack-loss time to exceed its former maximum of 2.5 minutes. In this connection it must be remembered that the smallest out-time that is considered permissible is an out-time OT of one minute and since a head wind may under some situations cause the stack-loss time to exceed its former maximum of 2.5 minutes the total time within the computer must be increased at the start end of its operation, and at least to an extent to leave an out-time of 1 minute. This second increase of total time in the computer is accomplished through the medium of the cam 165 and is effective only when the head-wind and tail-wind knob 160 is moved in a counter-clockwise direction from its zero position. This increase in time is caused by allowing the pointer 70 to assume a position counter-clockwise from its original 2.5 minute position. As is readily seen from the drawing (Fig. 8A) if the knob 160 is turned counter-clockwise to the −10 position (meaning head-wind position) the rack 65 is allowed to move toward the right through the action of the compression spring 240 to thereby cause counter-clockwise rotation of the gear 142 which in turn allows the pointer 70 to be moved counter-clockwise through the action of the spiral spring 125. This pointer will now indicate 2.7 minutes instead of the original 2.5 minutes for reasons given below. Marker 69 now indicates 2.0067 instead of its original 1.9157 minutes.

Let us now assume that an airplane, during a head-wind condition of 10 M. P. H. and with the knob 160 assuming its −10 position, is called from the holding stack just as it is flying over beacon RB2 and that 2.7 minutes elapse before it leaves the holding stack. Of the portion of this time in excess of 2.5 minutes, namely, 0.2 minute, about .08 minute was lost by the drift during the making of the semi-circle turn in the holding stack HS1 (Figs. 1 and 15) and about 0.12 minute was lost due to the drift during the straight line flight in the holding stack. This additional time of 0.2 minute was put into the computer by cam 165 (Fig. 8A). In this new position of the knob 160 the gear 98 engages the gear 236 instead of gear 237 so that pinion 91 rotates at 1.9157 times 125 M. P. H. divided by 135 or approximately 1.775 R. P. M., the northbound ground speed of the airplane having been reduced from 135 M. P. H. to 125 M. P. H. From the above considerations it is also known that the time 0.2 minute the cam 165 added was consumed in additional stack-loss time.

This additional time of 0.2 minute added by cam 165 is, however, in the computer and therefore must be considered. In addition the cam 166 will add enough time in the computer to compensate for drift during the average 1.15 semi-circle turn time which for reasons above given requires .091 flying time assuming a ground speed of 125 M. P. H. Since the out-time must be increased to an extent and the in-time must be decreased to an extent to compensate for the straight line flying drift and since the out-time must be increased to compensate for the extent the airplane is blown back during the semi-circular turn time, we will add this .091 minute into the computer by movement of the stop 156 (Fig. 8A) clockwise to this extent. The total time in the computer is therefore 4.4157+0.2+.091=4.7 deducting the stack-loss time SLT of 2.7 we have 2 minutes, and dividing by the speed of gear 91 which is 1.775 R. P. M. we have OT=1.125.

Let us now see how closely the total time consumed checks with the total maneuver time contemplated, namely, 5.696+0.2=5.896 minutes. The various times actually consumed were as follows: 2.7 minutes stack-loss time, 1.125 out-time, 1.196 minutes turn time (turn time for maximum stack-loss time), 125/145 of 1.125 or 0.96 minute in-time (not excluding the semi-circular drift portion) minus the semi-circular drift portion of 0.091 minute resulting in an in-time of 0.869 minute. Summing these up we have a maneuver time of 5.89 minutes. The discrepancy, it will be seen, is only 0.006 minute. It should be understood that the left wind, right wind, tail wind and head wind were not considered with respect to due north but with respect to the direction of the average direction holding loop line 239 illustrated in each of Figs. 12–15.

*Computer circuits—Figs. 6A, 6B and 6C.*—As already mentioned the computer illustrated in Figs. 7, 8A and 8B is divided into three units A, B and C and furthermore these three units may be controlled by one or more of three operators sitting before boards X, J and Z. It will be seen (Fig. 7) that each panel includes a token board containing indicating lights G, Y and R, token jacks OTJ, and push buttons PB for each altitude, and directly below each board are provided three small boards or panels designated unit A, unit B and unit C, respectively, each of which panels contain indicating lights G, R, Y and F, and push buttons 1, 2, 3 and 4. The push buttons 1, 2 and 4 particularly control the lamps G, Y and R respectively and therefore they have been coordinated therewith. From this construction (Fig. 7) it is readily seen that each operator may avail himself of any one of the units A, B or C of the computer depending upon which unit is not then in use and that for this reason three token jacks are provided for each altitude of the altitudes 1200, 2000 and 2500 feet, which are the altitudes from which landing maneuvers are made in the particular embodiment illustrated.

Referring now to Figs. 6A, 6B and 6C it will be seen that all of the apparatus above the bus wires of Fig. 6A is associated with unit A of the computer, that all apparatus above the bus wire in Fig. 6B is associated with unit B of the computer, and that all apparatus above the bus wire in Fig. 6C is associated with the unit C of the computer. It will also be seen that the apparatus below these bus wires in Figs. 6A, 6B and 6C are under the control of operators X, J and Z respectively. It will also be seen that each section of this latter apparatus is divided into three parts one for each of units A, B and C of the computer. In other words, the operator X, for instance, may operate any one of the push buttons 1 to 4 for any one of the computer sections A, B and C and each of these sets of push buttons has associated therewith lamps G, Y, R and P which are colored green, yellow, red and purple respectively. Operators J and Z are provided with similar apparatus. It will also be seen that each unit of the computer is provided with a green relay GR, a green repeater relay GRP, a yellow flashing relay YF, a yellow stick relay YS, a red stick relay RS, and three lock relays XL, JL and ZL. It is also apparent from Fig. 6A that panel X is provided with a peep-peep signal 226 and that panels J and Z are provided with peep-peep signals 216 and 217 respectively. These peep-peep signals 226, 216 and 217 are interconnected with the radios used by the operators X, J and Z respectively. As already pointed out each computer section is provided with computer controlled contacts 136, 137, 144, 145, 146, 147 (Figs. 4 and 8), 151—152 and 151—153 (Figs. 6 and 8), is provided with electromagnets OM and NM and is provided with a synchronous timing motor M (Figs. 6 and 8). The reference characters for these electromagnets and motors are provided with a suffix A, for unit A, a suffix B for unit B, and a suffix C for unit C of the computer.

The specific circuits involved will be more specifically discussed in the complete operation of the system hereinafter.

Figure 4:
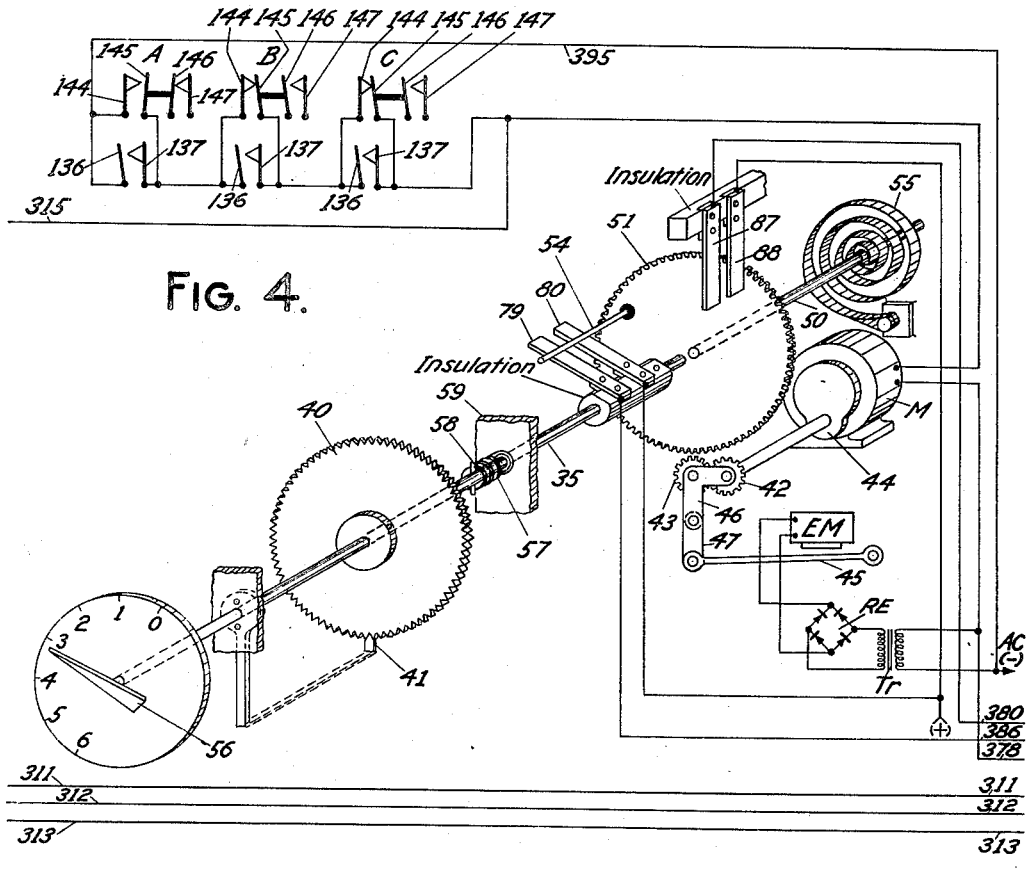
Fig. 4 illustrates a timer used for timing the starting of successive units of the computer illustrated in Figs. 8A and 8B.

*Timing motor and circuits.*—In view of the fact that the three units of the computer illustrated are to be used sequentially and that a certain interval of time must elapse between the starting of successive airplane landing flights, it is necessary to provide suitable timing means for rendering these units of the computer available one at a time at suitable time spaced intervals and for this reason the timing motor and associated apparatus illustrated in Fig. 4 has been provided. This apparatus operates in conjunction with the relays and associated circuits illustrated in Figs. 5, 6A, 6B and 6C.

As already pointed out the computer shown in Figs. 8A and 8B may assume any one of three normal positions each position signifying a minimum out-time position for that section or unit of the computer. As illustrated in Figs. 8A and 8B of the drawings, this computer is shown at rest in its zero position but the associated circuits illustrated in Figs. 4, 5, 6A, 6B and 6C assume it to be in its minimum out-time position for unit A as is evident from the fact that contacts 44—45 (Figs. 4 and 6A) are open whereas the corresponding contacts 44—45 for units B and C (Figs. 6A, 6B and 6C) of the computer are closed. The timer (Fig. 4) and the computer (Figs. 8A and 8B) are held at rest by open contacts 136—137 and 144—145 (Fig. 4).

The timing structure (Fig. 4) comprises a time shaft 50 containing a gear 51, this shaft 50 and gear 51 being biased to a normal position, where the conducting pin 54 engages contact springs 79 and 80, through the medium of a spiral spring 55. These contacts 79 and 80 may assume various adjusted positions as determined by the timing knob 56 (Figs. 4 and 7), which by being pushed in against the tension of spring 57 on time adjusting shaft 35 bearing against the cross pin 58, causes the toothed wheel 40 to disengage from the fixed anvil 41 to thereby permit rotation of this knob 56 to any desired new time position. As shown, the knob 56 assumes the three-minute position and under this adjusted condition the contacts 79—80 and 87—88 are separated such an arcuate distance that it will require the motor M through the medium of its pinion 42 and idler 43 three minutes to operate the gear 51 through this three minute arc from contacts 79—80 to contacts 87—88. The motor M preferably has a self-contained gear reduction mounted within gear casing 44 thereof. The motor M is capable of driving the gear 51 only when the electromagnet EM is energized. Energization of this electromagnet EM causes attraction of its armatures 45 to thereby operate the angle lever 46 through the medium of link 47, about the shaft of the motor M as a pivot to thereby cause the idler 43 to operatively engage the gear 51. For a more detailed description of this timing structure attention is directed to the copending application of Field, Ser. No. 476,207, filed February 17, 1943, which has resulted in Patent No. 2,378,293, dated June 12, 1945. The timing mechanism shown in Fig. 4 cooperates with the timing stick relays shown in Fig. 5 of the drawings.

Referring to Fig. 5 of the drawings the circuits therein are such that the relays are picked up and dropped in the following order from the condition in which they are shown with relays AD and AF energized: BF up, BD up, AF down, AD down, CF up, CD up, BF down, BD down, AF up, AD up, CF down, CD down. The specific manner in which these stick relays of Fig. 5 are controlled by the timer of Fig. 4 and the contacts of the units A, B and C (Figs. 6A, 6B and 6C) of the computer of Figs. 8A and 8B will be more specifically pointed out in the general operation hereinafter, but it may be stated that prefixes A, B and C of the reference characters in Fig. 5 denote the three units A, B and C of the computer.

*Token controlled circuits.*—As already pointed out the holding stack HS1 (Fig. 1) is outlined by an outer marker or radio beacons RB1 and by an inner marker or radio beacon RB2 and this holding stack has definitely defined altitudes as shown in Fig. 2 so that one airplane may be stored in each altitude of the holding stack. In order to keep advised of the airplanes stored in this holding stack as to their identity and the particular altitude in which each airplane is being stored on at least one of the control boards X, J and Z (Fig. 7), these control boards have been provided with altitude markings. The altitudes 3000, 3500 and 4000 are provided with a single token jack OTJ whereas altitudes 1200, 2000 and 2500 are provided with three token jacks OTJ on each of the boards X, J and Z.

Each token jack OTJ has associated therewith a green lamp G, a yellow lamp Y, a red lamp R, and a push button PB. Suitable circuits for controlling these lamps in accordance with contacts operated by the token jacks OTJ and MTJ and the push buttons PB have been illustrated in Fig. 9 of the drawings. These control circuits include for each board X, J and Z a two-position polar relay MS, preferably of the mag-stick type, a lock relay LR preferably of the neutral tractive armature type, a token jack OTJ and a push button PB.

In order to assure against the accidental indication of an occupied altitude in the holding stack as being clear, a monitor's board (see lower part of Fig. 9) is preferably provided, which board has similar indicating lamps G, Y and R connected directly in multiple with the indicating lamps G, Y and R of the operator's board and which is also provided with a token jack MTJ, and which prevents the operator's board indicating a clear altitude unless a monitor unaware of the operator's instructions substantiates that such altitude is clear. For each airplane in the holding stack there is preferably provided an operator's token (see 317, Fig. 7) and a monitor's token (see 316, Fig. 9), each of which tokens properly identifies the airplane as by number, cargo, and possibly the pilot's name, etc. and it is proposed that these tokens will be inserted in the altitude in which the airplane is actually flying or from which he has departed but has not yet reached the new altitude into which he is to proceed. The structure illustrated in Fig. 9 is for altitude 3000 feet (Fig. 7).

The structures for altitudes 3500, 4000 and higher altitudes as well as for the ground altitude G are identical to that illustrated in Fig. 9, but the circuits for altitudes 1200, 2000 and 2500 are slightly different in that three token jacks OTJ are provided for each altitude for each board X, J and Z. The modification that is necessary to take care of three, instead of one, tokens per altitude per board has been illustrated in Fig. 10 of the drawings. By referring to Fig. 10 it is readily seen that the token jack contacts are so organized that the same function will be performed irrespective of which token jack of the three token jacks illustrated is used by the insertion of a token therein.

Referring now again to Fig. 9 of the drawings, let us assume that the operator X is ready to ladder an airplane down from the 3500 foot altitude to the 3000 foot altitude for which circuits have been illustrated in Fig. 9. It will be observed that under normal conditions, meaning altitude-vacant conditions, the green light G is illuminated for the 3000 foot altitude on each of the three operator boards X, J and Z and on each of the three monitor boards X, J and Z thus manifesting an unoccupied altitude. The operator will first depress the push button of altitude 3000 feet and if the associated yellow lamp lights up will advise the pilot flying in altitude 3500 that he may descend to the altitude 3000 (Figs. 2 and 9) in the holding stack HS1 (Fig. 1). Depression of this push button PB by the opening of contact 350 will cause deenergization of the lock relay LR, board X, to thereby close its back contact 351 resulting in the closure of a (+) polarity energizing circuit for the relay MS, board X, which may be traced from the positive terminal of a suitable battery at 352 (see upper left-hand corner of Fig. 9), front contact 353 of lock relay LR, board Z, front contact 354 of lock relay LR, board J, push button contact 355, board X, token jack contact 356, board X, back contact 351 of lock relay LR, board X, through the winding of the mag-stick relay MS, board X, to the common return wire CC connected to the mid-point of the battery 352. The completion of this circuit will cause the contacts 357, 358, 359 and 360 of the relay MS, board X, to be operated to their right-hand position. The contact 357 prepares a token controlled circuit for returning the relay MS, board X, back to its normal position; the contact 358 causes a second break in the circuit for the lock relay LR; the contact 359 closes an energizing circuit for the yellow lamp Y on both the operator's board and the monitor's board X, and the contact 360 extinguishes the red lamps R on both boards X, which lamps R were momentarily energized while the lock relay LR was deenergized and the mag-stick relay MS has not yet responded but the red lamps R on both the operator's panel and the monitor's panel of both boards J and Z remain lighted. The green lamp G is now deenergized on each of the three operator's boards X, J and Z and on each of the three monitor's boards X, J and Z by reason of the opening of contact 362 of the lock relay LR, board X.

With the token lamp Y for board X on both the operator's and the monitor's board now illuminated and with all of the green token lights G extinguished and with all of the red lamps R except those on the operator's X board and on the monitor's X board lighted, the operator and monitor are both informed that an airplane is proceeding to this altitude 3000 feet to be handled by the X operator. The monitor is provided with a radio telephone which enables him to hear the pilot but does not enable him to hear the operator's instruction to the pilot so that the monitor's response to a statement by the pilot that the pilot has entered altitude 3000 feet simultaneously with similar action by the operator is a definite check that the airplane has actually reached this altitude.

Let us now assume that the pilot reports having descended into the 3000 foot altitude and that this report is heard by both the operator and the monitor. The operator will remove his token identifying that airplane from the token jack OTJ of the 3500 foot altitude and insert it in the 3000 foot altitude, board X (Fig. 9), and the monitor will do likewise and insert his token identifying this same airplane in his token jack MTJ of altitude 3000, board X. The insertion of these tokens in the token jacks OTJ and MTJ will close a negative energizing circuit for the mag-stick relay MS, board X, which may be traced from the (—) terminal of the battery 352, through contact 363 of token jack MTJ, monitor's board X, contact 357 of the mag-stick relay MS, contact 356 of the token jack OTJ, operator's board X, back contact 351 of the relay LR, board X, through the winding of the relay MS and to the common return wire CC connected to the mid-point of the battery 352. The completion of this circuit operates the relay MS back to its left-hand normal position and in so doing closes circuits for the red lamps R on the operator's board X and the monitor's board X and extinguishes the lamps Y on these boards. This illumination of all of the six red lamps R is due to the fact that the lock relay LR is now in its deenergized position with all of the mag-stick relays MS in their normal positions. This lock relay LR for board X does not pick up in spite of the closure of contact 358 of relay MS, board X, because the contact 365 of token jack OTJ, operator's board X, and contact 366 of the token jack OTJ, monitor's board X, are now open. With the lock relay LR, board X, deenergized its open contacts 366 and 367 render the push buttons PB on boards J and Z ineffective. From this consideration it is seen that proper interlocking is provided whereby the use of this apparatus on one board renders the apparatus on the other two boards for the same altitude ineffective.

As the pilot is eventually called by the operator to vacate the altitude 3000 and enter the altitude 2500, or some other altitude, and as the pilot reports vacating altitude 3000 feet, which is heard by both the operator and the monitor, the operator and monitor will remove their tokens from token jacks OTJ and MTJ, respectively, and as they do so an energizing circuit for the lock relay LR, board X, is completed, which may be traced from the terminal (+) of the battery 352, contact 363 of token jack MTJ, monitor's board X, contact 350 of the push button PB, contact 365 of the token jack OTJ and contact 358 of relay MS, operator's board X, through the winding of the lock relay LR to the other terminal (—) of this battery 352. The apparatus for board X has thus been returned to its normal condition in which not only the green token lamp G of board X but the green token lamps G of boards J and Z also are illuminated, the six token lamps R having been extinguished by the opening of back contact 364 of lock relay LR, board X.

Referring again to Fig. 10 of the drawings, it is now readily understood that the depression of the push button PB of Fig. 10 will produce the same result as the push button PB, board X, of Fig. 9, provided, however, that all three of the token jacks OTJ (Fig. 10) are not occupied by a token, in that the normal energizing circuit for the relay MS (Fig. 10) is broken when there is a token in any one of the token jacks OTJ. Also, that a circuit for returning the mag-stick relay MS back to its left-hand position may be closed when there is a token in any one of the three token jacks OTJ (Fig. 10) and furthermore that there is a token in the token jack MTJ, monitor's board X (Fig. 9). Also, the lock relay LR can only be energized if all of the token jacks OTJ (Fig. 10) are unoccupied by tokens.

Figure 10:
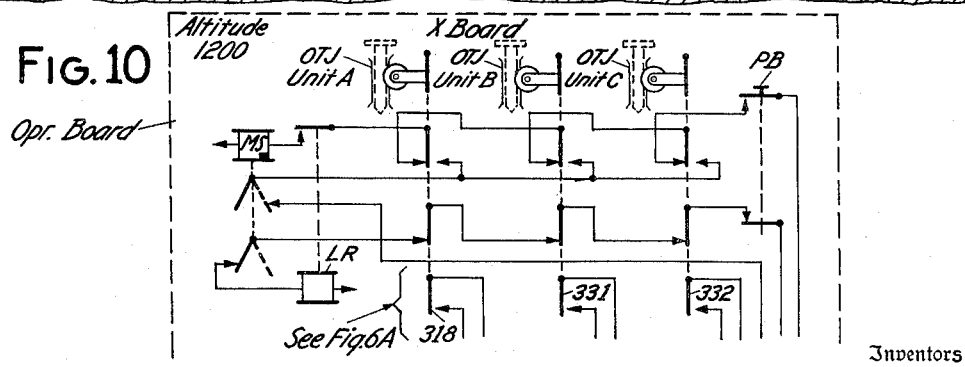

Referring to Figs. 9 and 10 it will be observed that the token jack OTJ, unit A, board X (Fig. 10) and monitor's board X (Fig. 9) are provided with a contact 318. This token jack contact 318 is also shown for unit A, board X, Fig. 6A of the drawings. This contact 318 is used for closing a pick-up circuit for the lock relay XL, unit A, of the computer circuits (Fig. 6A). It will be observed that similar contacts 331 and 332 are provided for token jacks OTJ for units B and C of the computer for board X, (Fig. 10 and Fig. 6A) for picking up lock relays XL for units B and C (Figs. 6B and 6C). It may be argued that the monitor obtains too much information by the lamp G, Y and R illustrated on the monitor's panel (Fig. 9). For this reason, if desired, only the red lamps R on the monitor's board may be retained, either as shown or these red lamps will be directly connected to the bus wire 361 and this bus wire will be energized if any one of the lock relays for that altitude is deenergized.

*Operation of system.*—The successive steps in the operation of the system as a whole will now be considered. Let us assume that altitudes 1200, 2000 and 2500 feet of the holding stack HS1 (Fig. 1) are occupied by airplanes 371, 372 and 373, respectively, and that none of these airplanes as identified by tokens 371, 372 and 373 (Fig. 7) have yet been called from the holding stack. Let us further assume that the computer shown in Figs. 8A and 8B has not been used for some time and that the unit C thereof was last used. The computer will therefore have been stopped (timer of Fig. 4 also) in the unit A minimum out-time position. This is indicated by open contacts 144—145 and 136—137 (Fig. 4).

Referring now to Fig. 4 of the drawings the last time that the timer (Fig. 4) assumed its normal position (illustrated in the drawings) the motor M and the electromagnet EM, through the medium of rectifier RE, received energizing current through the circuit which may be traced from the terminal AC(+) of a suitable source of alternating current, back contact 375 of the relay CF, back contact 376 of the relay BF, back contact 377 of the relay AF, wire 378, winding of the transformer Tr to the other terminal AC(—). The current for the motor M flowed through contacts 144—145, unit C, 144—145, unit B, and 144—145, unit A of the computer. Current, through the medium of these contacts could also flow to wire 315 supplying the motors MA, MB and MC (Figs. 6A, 6B and 6C) when completed at front contact 53 of relay GR as shown for relay GR of Fig. 6A. The current supplied to the motor M caused it to operate and the current supplied to transformer Tr caused the electromagnet EM to assume its energized position to thereby operatively connect the motor M to the gear 51. Three minutes of such operation was required to operate the gear 81 to a position where its contact pin 54 engaged the contact springs 87 and 88. This caused the completion of a direct current circuit that may be traced from the terminal (+) of a suitable source of direct current, contact 88—54—87, wire 380, back contact 381 of the relay CD, back contact 382 of the relay BD, back contact 383 of the relay AD, through the winding of the relay AF to the other terminal (—) of this source. The picking up of the relay AF by the opening of its back contact 377 and with front contact 385 of the relay AD still open caused breaking of the alternating energizing circuit heretofore traced to thereby cause the deenergization of the electromagnet EM and the motor M (Fig. 4). Dropping of the electromagnet M caused the pinion 43 to disengage from the gear 51 to thereby allow the spiral spring 55 to very quickly return the timing apparatus to its biased position in which it has been illustrated in Fig. 4. This return of the timing mechanism to its normal biased position causes closure of the following pick-up circuit for the relay AD: beginning at the terminal (+), contacts 80—54—79, wire 386, front contact 387 of the relay AF, back contact 388 of the relay BF, front contact 389 of the relay AF, winding of the relay AD to the other terminal (—). With the relay AD now picked up it is held up by a stick circuit including its stick contact 391 and the front contact 390 of the relay AF. The relay AF is also held up by a stick circuit including its stick contact 393 and the back contact 392 of the relay BD.

When the relay AF picked up as just described and with the relay AD still deenergized an energizing circuit was closed for the green relay GR (Fig. 6A) which may be traced from the terminal (+) of a suitable source of direct current, front contact 395 of the relay AF, back contact 396 of the relay AD, wire 311 (Figs. 5, 6C, 6B and 6A), winding of the relay GR to the other terminal (—) of this source. The completion of this circuit caused the relay GR (Fig. 6A) to be picked up and stuck up through a stick circuit including the back contact 319 of the relay YF (Fig. 6A) and the stick contact 397 of the relay GR. A second stick circuit for relay GR, also closed, includes the same stick contact and back contacts 399, 409 and 411 of relays XL, JL and ZL respectively. A third stick circuit for relay GR includes a normally closed contact of the associated push button 2. The picking up of this green relay GR (Fig. 6A) caused its repeater relay GRP to pick up through the medium of front contact 385 of relay GR. With this relay GR (Fig. 6A) now energized an alternating current energizing circuit for the timing motor MA (Figs. 6A and 8B) is closed through the medium of front contact 53 of the relay GR, winding of this motor MA, wire 315 (Figs. 6A, 6B, 6C and 4), contacts 144—145 of each of the units C, B and A of the computer (Fig. 4), wire 395, to the other terminal AC(—) of this source of alternating current.

Referring now to Figs. 8A and 8B of the drawings operation of the motor MA causes the computer aparatus for unit A of the computer to operate and since it is assumed that the operator or dispatcher does not contemplate a landing maneuver immediately he does not operate any push buttons and for this reason the computer will keep operating until the contact operator cam 140 (Fig. 8A) opens contacts 144—145 and closes contacts 146—147 (Figs. 4, 6A and 8A). The closing of contacts 146—147 prepares a circuit for the yellow lamp Y for all three units A of boards X, J and Z. These contacts are make-before-break to assure that the yellow lamp circuit is prepared before the motor MA is stopped. The opening of contact 144—145 of unit A (Figs. 4 and 8A) opens the circuit for the motor M (Fig. 4) as is obvious from Fig. 4 of the drawings in that the contacts 136—137 in multiple therewith (Fig. 4 and Fig. 8B) are also open. Referring to Fig. 4 not only does the opening of contacts 144—145 of unit A break the energizing circuit for the motor M but it also removes the terminal AC(—) from the wire 315 which is the return wire for current flowing through the motor MA (Figs. 6A and 8B). The unit A of the computer shown in Figs. 8A and 8B now stops and assumes its minimum out-time position and the units B and C will remain in their zero position because the time spacing knob 56 (Figs. 4 and 7) assumes the three-minute position and the computer has only operated 2.5 minutes (maximum stack-loss time), all as shown by the various dials illustrated in Fig. 16 of the drawings. In this connection it should be observed that the dials of the units A and B of the computer illustrated in Fig. 7 of the drawings assume the zero position whereas the dials of unit C assume the minimum-loop position. This minimum out-time or minimum-loop position assumed by the unit A (Figs. 4, 5, 6A and 16) of the computer permits the first airplane to be maneuvered into a landing position by using less than the usual landing time of 5.696 minutes heretofore assumed to be total maneuvering period. This is as it should be in that there is no airplane ahead of the airplane next to make a landing so that the first airplane to land may use a shorter maneuvering time to the turn point. This shorter time is equal to the stack-loss time plus one minute and therefore depends on the location of the airplane in the holding stack.

The picking up of the green relay GR (Fig. 6A) also closed an energizing circuit for the green lamp G, board X, unit A (Figs. 6A and 7) which may be traced from the terminal (+) of a suitable source of current, back contacts 400, 401 and 402 of relays XL, JL and ZL respectively (Fig. 6A), back contact 403 of the relay YF, front contact 52 of relay GR, back contact 404 of the relay ZL, back contact 405 of the relay JL, wire 288, lamp G, to the other terminal (—). Similar circuits may be traced through back contact 427 of relay XL and wire 246 for green lamp G, unit A, board J, and through back contacts 428 and 429 of relays XL and JL respectively, and wire 264 for lamp G, unit A, board Z. The operators located in the tower where these panels and computer are located are now aware of the fact that the unit A of the computer may be used for a landing maneuver and since the token 371 which represents the airplane in altitude 1200 which operator X contemplates landing is located in token jack OTJ (317) it closes a pick-up circuit for the lock relay XL (Fig. 6A) which may be traced from the terminals (+) of a suitable source of energy, token contact 318 (Figs. 6A and 9), wire 295 (Fig. 6A), winding of the lock relay XL of unit A, board X, of the computer, back contact 407 of the lock relay JL, back contact 408 of the lock relay ZL and to the other terminal (—) of the source of current. Since unit A already assumes the minimum out-time position where contacts 146—147 (Figs. 4, 6A and 8A) are closed the yellow light Y, unit A, board X, is also lighted. The picking up of this lock relay XL by the opening of its back contact 406 breaks the pick-up circuit for the lock relay ZL and by the opening of its back contact 410 breaks the pick-up circuit for the relay JL so that the other two lock relays JL and ZL on board X can no longer pick up. Board X may, however, still use unit B or C or both for other altitude maneuvers and for this reason similar relays XL are provided in Figs. 6B and 6C. Also, the picking up of the contact 400 of the lock relay XL, unit A, causes the green lamp G, unit A, board X, to be changed from steady to flashing as is readily seen from the circuit (Fig. 6A). Also, the opening of back contacts 427 and 428 of relay XL (Fig. 6A) extinguish the green lamps G for unit A on boards J and Z. Also, the closing of front contact 412 of relay XL, unit A, prepares the red light circuit 289, unit A, board X, and prepares stick circuits for relays YF and YS, same unit. The closure of the front contact 412 of this lock relay XL, unit A, also closes an energizing circuit for each of the three purple lights P shown for unit A on each of the boards X, J and Z (Figs. 6A, 6B and 6C), which circuit may be traced from the terminal (+), front contact 412 of the relay XL, bus wire 273 extending to all of these purple lights P. This lock relay XL, unit A, when once picked up is stuck up through a stick circuit including its stick contact 329, wire 291, and normally closed contact 336 of push button 4, unit A, board X (Fig. 6A).

With the unit A of the computer illustrated in Figs. 8A and 8B now in its minimum out-time at-rest position (see dials of Fig. 16 and contacts 144—145 and 136—137 of Figs. 4, 6A, 8A and 8B open and contacts 146—147 of Figs. 4 and 6A closed), let us assume that the operator calls the airplane 371 for a landing maneuver from altitude 1200 in the holding stack HS1 (Fig. 1 and see token 371, Fig. 7) and as he does he depresses his push button 1 for unit A, board X (Figs. 6A and 7). Depression of the push button 1, unit A, board X (Fig. 6A), closes an energizing circuit which may be traced from the terminal (+), front contact 414 of the relay XL (Fig. 6A), wire 290, push button 1, unit A, board X, wire 279, front contact 415 of the relay GRP, winding of the relay YF (Fig. 6A) to the other terminal (—). This relay YF once picked up is stuck up through a stick circuit which may be traced from the terminal (+), front contact 412 of the relay XL, back contact 322 of the relay RS, and stick contact 416 of relay YF. The picking up of the relay YF causes the green lamp G to change from flashing to steady as is readily observed from the movement of the contact 403 of this relay from its back flashing energy position (providing a lock relay of that unit is up) to its front steady energy position.

As pointed out hereinbefore the contacts 146—147 (Figs. 6A and 8A) close simultaneously with the opening of contacts 144—145 and with the lock relay XL, unit A, now in its energized position the yellow lamp Y for unit A, board X, is illuminated through a circuit which may be traced from the terminal (+), contacts 146—147 (Fig. 6A), front contact 320 of the relay GR, front contact 417 of the relay XL, unit A (Fig. 6A), wire 287, yellow lamp Y, unit A, board X (Fig. 6A), to the other terminal (—). As the pilot of airplane 371 now proceeds to leave the holding stack HS1 (Fig. 1) as he passes over the beacon RB1 he announces his leaving the stack to the operator over his radio telephone and the operator in response to that announcement announces the heading angle at which the pilot is to fly into the holding loop to the pilot. This heading angle will be read from the indication of pointer 72 on dial 73 (Fig. 16) which is 324.7°. The pilot will now head his plane by reference of his compass in this direction. The operator upon announcing the heading angle also depresses the push button 2, unit A, board X (Fig. 6A), and thereby breaks the only remaining stick circuit for the relay GR which may be traced from the terminal (+) of a suitable source of current, back contacts 411 and 409 of the relays ZL and JL respectively, wire 254, normally closed contact of push button 2, wire 286, and stick contact 397 of the relay GR. Dropping of the relay GR by the opening of its front contact 385 causes deenergization of the slow dropping repeater relay GRP. During the interim of the dropping of these two relays the following circuit for the out-time magnet OMA of unit A of the computer (Figs. 6A and 8B) is momentarily energized including the back contact 385 of relay GR and the front contact 621 of the relay GRP.

The dropping of the relay GR, unit A, by the shifting of its contact 320, and with relay YS still down, causes the yellow lamp Y, unit A, board X, to change from steady to flashing. Also, the dropping of relay GRP by the dropping of its contact 298 prepares the pick-up circuit for relay YS. The pilot will repeat back the heading angle to the operator of board X and if it agrees with the instructed angle the pilot will depress push button 3, unit A, board X, to thereby close the following pick-up circuit for relay YS, unit A: beginning at the terminal (+) of a suitable source of current, front contact 414 of relay XL, unit A, wire 290, contact of push button 3, unit A, board X, wire 267, back contact 298 of relay GRP, front contact 299 of relay YS, winding of relay YS to the other terminal (—). The picking up of relay YS, unit A, it being stuck up through a stick circuit including front contact 412 of relay XL, unit A, back contact 322 of relay RS and stick contact 323 of relay YS, by the closure of its front contact 325 prepares a pick-up circuit for relay RS at one point, and also through its contact 324 changes the yellow lamp Y from flashing to steady.

Referring now to Fig. 8B of the drawings the momentary energization of the out-time magnet OMA causes the spider 85 to be operated in a counter-clockwise direction so that the gear 76 is disengaged from the pinion 90 and is operatively engaged with pinion 91, the gear 75 being locked by the locking member 120 during this shifting of the spider 85. The gear 76 of the computer is now operated at a speed 1.9157 times as fast as it was during the energization of the motor MA and with the spider 85 in its normal position. By looking at Fig. 16 it can readily be seen that the pointer 70, unit A, need only operate through an arc equivalent to 1.9157 minutes on dial 71 before the end of the peep-peep signal as indicated by marker 69 and since the gear 76 now operates at the increased speed just mentioned it will take just one minute until the end of the peep-peep signal time is reached. Continued operation of the unit A of the computer after shifting of spider 85 for a period of 10 seconds less than one minute causes the contact operator 150 (Fig. 8A) to close contacts 151—152 (Figs. 6A and 8A) and as these contacts are closed a circuit for picking up the red stick relay RS for unit A (Fig. 6A) is closed. This circuit may be traced from the terminal (+) of a suitable source of current, front contact 412 of the lock relay XL, computer contacts 151—152 (Figs. 6A and 8A), front contact 325 of the relay YS through a winding of the relay RS to the other terminal (—).

The picking up of the relay RS through the medium of its front contact 420 closes an energizing circuit for the peep-peep signal 226, which circuit includes not only this front contact 420 but also includes front contact 421 of the lock relay XL. This peep-peep signal continues to sound for about 10 seconds as determined by the length of the notch in the cam 150 (Fig. 8A) of the unit A of the computer. This peep-peep signal is not only heard by the operator of board X but can also be heard by all pilots tuned to the X carrier frequency. When this peep-peep signal time has expired the contact 151 (Figs. 6A and 8A) shifts from contact 152 to contact 153 to thereby cause the red light R, unit A, board X (Figs. 6A and 7) to flash to thereby advise the operator that he is to instruct the proper pilot, as by identifying him by name or number, to make his one minute semi-circular turn which he does. The switching of the contacts 151 from contact 152 to 153 not only causes flashing of the red light but also causes deenergization of the relay RS because the intervals between flashes is sufficient to allow deenergization of the relay RS during this temporary interruption of its stick circuit. Dropping of the relay RS will of course stop the sounding of the peep-peep signal.

The operator now awaits the repeat-back announcement by the pilot that he has heard the instructions to make his one-minute semi-circular turn and in response to this repeating back of these instructions to the operator the operator depresses the push button 4 which results in the momentary closure of the circuit for the normal electromagnet NMA (Figs. 6A and 8B) which circuit may be traced from the terminal (+) of a suitable source of current, front contact 414 of the lock relay XL, wire 290, contact 423 of push button 4, wire 276, winding of the electromagnet NMA (Figs. 6A and 8B) to the other terminal (—) of said source. Referring now to Fig. 8B the momentary energization of the electromagnet NMA will cause the lock arm 130 to allow the spider 85 to move only to just beyond its middle position, from which position the toggle spring 113 will tend to complete the operating stroke and will complete the operating stroke after the slow dropping period of this electromagnet NMA has expired. The slow dropping feature of electromagnets OMA and NMA (Figs. 6A and 8B) has been conventionally illustrated by the shading at the lower end of their windings. Upon releasing of the armature 114 of electromagnet NMA the stop arm 130 will be withdrawn and the toggle spring 113 will complete the operating stroke of the spider 85. During this hesitation of the operation of the spider 85 the spiral spring 125 will have had an opportunity to return, and will have returned, the time shaft 61 and all apparatus associated therewith to its normal zero position. This restoration of the time shaft 61 back to its normal zero position causes contacts 151—153 (Figs. 6A and 8A) to be opened to thereby stop the flashing (no steady light either) of the red light R through the flashing circuit heretofore traced. The pilot will as soon as he vacates the 1200 foot altitude report this fact to the operator who will then remove his token 371 (Figs. 6A and 7) from token jack OTJ (317) and in so doing will open the contacts 318, unit A, board X (Figs. 6A and 9), to thereby open the pick-up circuit for the lock relay XL, unit A (Fig. 6A), and the operator will insert the token 371 in the token jack OTJ (see 330, Fig. 7) this movement of the token having been preceded by the pushing of the push button PB for this ground altitude G and the lighting of the yellow lamp (board X) for the ground altitude. The removal of the token 371 in conjunction with the removal of the monitor's token 317 will result in the extinguishment of the red lamp R on the token board X (Fig. 7), and the lighting of the green lamp G on all token boards, altitude 1200. This insertion of the token in the ground altitude G will cause extinguishment of the yellow lamp and the illumination of the red altitude lamp R for this altitude all in a manner as already explained in connection with the operation of the apparatus illustrated in Fig. 9 of the drawings and which requires the cooperation of the monitor. As soon as the pilot reports having started making his turn the operator will depress the computer push button 4 for unit A, board X, and in so doing will cause deenergization of the lock relay XL, the extinguishment of all of the three purple lights of units A on boards X, J and Z. The green lamp G, unit A, on all boards will, however, not become energized until the timer (Fig. 4) has picked up again relay AF (Fig. 5) and it has picked up relay G, unit A (Fig. 6A).

At the instant the unit A has been operated to a point under the condition assumed where half of the minimum out-time of one-minute operation has taken place, that is when the airplane 371 is a distance of one-half minute out along the line OT, the unit B of the computer starts operating. This operation of the unit B of the computer is accomplished through the medium of the picking up of the relay BD (Fig. 5) which results in deenergization of the relays AF and AD sequentially in that order.

With the relay BD now energized for reasons already described an alternating current energizing circuit for the motor M and transformer Tr (Fig. 4) is completed which includes contacts 375, 425 and 377 of the relays CF, BD and AF respectively (Fig. 5), and wire 378. Just preceding the picking up of the relay BD the following circuit for the relay GR of unit B of the computer (Fig. 6B) was momentarily closed this circuit being traceable from the terminal (+) of a suitable source of direct current, front contact 426 of the relay BF (Fig. 5), back contact 427 of the relay BD, wire 312 (Figs. 5, 4, 6C and 6B), winding of the relay GR, unit B (Fig. 6B) to the other terminal (—) of this source of current. This causes the relay GR (Fig. 6B) to pick up and light the green lamp for unit B on each of the three panels X, J and Z. The picking up of this relay GR of unit B of the computer will start operation of the motor MB (Fig. 6B) and will start the measuring of stack-loss time for this unit B of the computer. It is of course assumed that operator Z will call airplane 372 from the holding stack HS1 (Figs. 1 and 2) as soon as the green lamp G, unit B, on all the boards X, J and Z becomes energized, the operator Z simultaneously with such calling, or shortly before or thereafter, depressing the push button PB for altitude 1200 and requesting the pilot of airplane 372 to descend into the next lower altitude 1200.

The operator of board Z has token 372 assigned to him as is evident from Fig. 7 of the drawings. He will, as just pointed out, simultaneously with such request depress the push button PB for altitude 1200 on board Z resulting in the lighting of the yellow lamp Y altitude 1200, board Z. After the airplane has nosed down or has fully vacated altitude 2000 the pilot will report this fact to the operator Z who will then remove token 372 from the middle one of the three token jacks OTJ on board Z at the 2000 foot altitude and will insert it in the 1200 foot altitude token jack directly below. The depression of the push button PB for altitude 1200, board Z, changed the green lamp which was formerly lighted to the lighting of the yellow lamp and the transfer of the token 372 from the 1200 foot altitude to the 1200 foot altitude now changes the lighting of lamps in the 1200 foot altitude from yellow to red and it also extinguished the red light in altitude 2000. The green lamps G for altitude 1200, boards X and J, will also be extinguished. In the same manner the operator of board J may ladder the airplane 373 down from the altitude 2500 foot to the altitude 2000 foot. If a monitor's board is employed the monitor must of course cooperate to obtain the proper lighting of the indicating lamps.

In all other respects the operation of the unit B of the computer is exactly the same as that of the unit A just described except for the fact that in this case the airplane was called from the holding stack at the time the computer started measuring the stack-loss time whereas for unit A it stood in the minimum out-time position (see Fig. 16) and for this reason the second airplane 372 to land must consume its entire maneuver time of 5.696 minutes during its landing maneuver to a landing position directly over the beacon RB1 (Fig. 1, southward flying), whereas the first airplane 371 consumed only approximately the stack-loss time plus 3.196 minutes (twice minimum out-time plus maximum circle time).

The operation of unit C of the computer in connection with the landing maneuver of airplane 373 is exactly the same as that of unit B in that both of these units stood in the zero position when the airplane was called from the holding stack.

Referring to Fig. 7 it should be observed that the nine unit panels each have the push buttons 1, 2 and 4 directly below the associated lamps G, Y and R, respectively. This is of real significance in that pushing of the push button 1 results in the picking up of the relay YF which changes the flashing green lamp G with which it is coordinated to steady, in that depression of push button 2 results in the dropping of the relays GR and GRP which causes the lighting of the lamp Y (except when unit A already assumed minimum position) with which it is coordinated and in that depression of the push button 4 (first operation) causes operation of the spider 85 (Fig. 8B) to normal which results in the extinguishment of the red lamp R with which it is coordinated.

Referring to Fig. 7 it will be seen from the locations of the tokens in the token jacks that the airplanes 371, 372 and 373 had their landings supervised by operators X, Z and J respectively and in that order. It was not necessary for the second operator J to land the second airplane 372. In fact they could have all been landed by the same operator. The reason for the three token jacks for each altitude 1200, 2000 and 2500 feet on each board is that by this construction each token is lined up with the unit panel of the computer unit used for its landing. It also aids the operator in reading the proper dials on the computer for a particular airplane.

As shown in Fig. 7 each operator has his own receiver and microphone of a radio telephone system. If these operators are to talk to different pilots at the same time each radio phone should be a head phone and must operate on its own carrier frequency. In some cases each operator may represent a different airline or branch or the military service each using a different carrier frequency. Another arrangement may be such that each airplane as it enters the holding stack will be assigned a carrier frequency to which he will tune his receiver, and stay tuned, during the landing maneuver. In this case the airplanes and their representative tokens are preferably divided among the operators in rotation according to altitudes. In those cases where they can be handled by less than three operators one or two operators will have the tokens assigned to them and the rest of the panels will not be used. Also, if desired, one operator may take care of all laddering down in the stack above the highest landing maneuver altitude (2500 feet) after which each pilot is instructed to tune to the proper carrier frequency to agree with the carrier frequency of the radio phone used by the operator that is to land him. In this way as many as four or more operators may independently and simultaneously carry on conversations with pilots.

It should be observed that a particular computer unit is started into operation automatically by the timer of Fig. 4 and that the green lamp for such unit is lighted simulatneously and on the three panels for that unit with such starting. Should the operator for some reason or another, such as lack of access to the radio telephone system, fail to call the pilot in time, say when the pilot is approaching the radio beacon RB2, it could very easily result in a stack-loss time in excess of 2.5 minutes as a result of which contacts 144—145 of such unit would open and stop not only the stack-loss time motor MA, MB or MC (Figs. 6A, 6B and 6C) but also the timing motor M (Fig. 4). This would not only increase the maneuver time for this particular airplane and the unit used in connection with its landing maneuver but would also delay the starting of all following airplanes. It would, however, not delay the airplane in advance in that such airplane in advance would be beyond the out-time line in the holding loop.

It should be observed that the yellow lamp Y of any unit of the computer is only changed from steady to flashing and then from flashing to steady when that unit of the computer stood automatically stopped in the minimum out-time position when the airplane was called from the holding stack and in this case the two steady indications can be distinguished from each other because the second steady indication has associated therewith a lighted purple lamp only whereas the first steady yellow indication has also associated therewith a lighted green lamp. Also the green lamp G is first lighted steady, then flashing and then steady and the second steady can be distinguished from the first steady by an associated lighted purple lamp.

In the operations of the unit A of the computer under various wind conditions above considered only wind conditions from four different directions were considered. Since any wind from a different than said four directions may be divided into two components one for each of two of the directions considered and by reason of the construction of the computer, substantially correct computation, irrespective of the direction and velocity (within limits) of the wind, will result.

Although the circuits for units B and C (Figs. 6B and 6C) of the computer were not specifically described their relationship to the system will be readily understood from cursory inspection of the circuits. In this connection it may be pointed out that the circuits on each of Figs. 6A, 6B and 6C are identical and have been repeated only to show more fully how they are interconnected. No further description is believed necessary than to say that if a landing maneuver has been once started on one of the nine unit panels shown at the bottom of Figs. 6A, 6B and 6C other operators cannot interfere with the proper functioning of that unit panel. This is true because all of the normally open contacts of push buttons on each of the nine unit panels (Figs. 6A, 6B and 6C) are supplied with energy only when its particular lock relay, there being nine such lock relays, is energized. These lock relays XL, JL and ZL for a particular computer unit are so interlocked that only one of these lock relays of such unit of the computer can be energized at any one time. A plurality of XL relays may, however, be energized at the same time and this is necessary when a single operator X handles more than one airplane for landing maneuvers at one time.

The computer described is not a mathematically accurate calculator and by slight modification it can be made still more accurate than the disclosure described. The principle upon which it operates and one complete set of constants has been disclosed and it should be understood that a departure from the specific construction shown and described is not a departure from the invention. For instance the arcuate slots in the multiplying plate may be modified to obtain maximum accuracy under a particular set of factors and the exact construction shown may be departed from within the scope of the present invention. There are certain corrections for which means could be incorporated in the computer but the means have been omitted because the problem requiring solution does not demand the accuracy such corrections would make. The slight advantage in accuracy to be gained by incorporating means to carry out such corrections does not justify the additional complication and cost of the structure and for this reason these additional means have been omitted from the disclosure.

*Direction knob.*—The direction or orientation knob 195 (Fig. 7A) is used to properly convert the acute angles designated in each of Figs. 1, 12, 13, 14 and 15 into azimuth degrees displayed over the control boards (Fig. 7) and on the heading angle dials shown in Figs. 8A and 16. With this knob 195 assuming the N (north) position as illustrated the azimuth angle is equal to 360° minus the degrees of the acute angle of an out-time line with respect to the radio beacon line or landing flight line RB1—RB2 (Figs. 1 and 12–15). This knob 195 will assume the N position only if the landing flight line extends from due north toward the runway as is true in each of Figs. 1, 12, 13, 14 and 15. If this landing flight line extended, for instance, from the east the direction knob 195 would be placed in the E position and in this case the indicated azimuth angle would be 90° minus the acute angle of the out-time line with respect to the landing flight line. In the same manner runways may extend in other directions and in each case the knob will be turned to correspond to the direction of the runway to be used. In those cases where the landing pattern is not lined up with the landing strip or runway the knob 195 will be set with respect to radio beacon line of the landing pattern rather than with respect to the direction of the runway.

In the foregoing discussion it was assumed that the time separation knob 56 (Fig. 7) assumed the three-minute position so that airplanes would be called from the holding stack at intervals three minutes apart. It is readily seen that if the system were always to use three minutes separation between calling times, and assuming a no-wind condition, the dial itself could have been omitted and also a two unit instead of a three unit computer could have been used. This is true because the first unit would have completed its computing function before a third airplane could be called from a holding stack. In practicing the invention by the specific apparatus disclosed it is more likely that a separation of two minutes would be a more practical application of the specific structure and even then only two units of the computer would come into play in overlapped relationship. The question that then presents itself is how many units would be required in the computer for one minute separation. Since the period of operation of a computer unit is equal to the maximum stack-loss time of 2.5 minutes plus minimum out-time of one minute making a total of 3.5 minutes it is readily seen that at least a four unit computer would be required for one minute separation and that if airplanes were actually called one minute apart all four of these units would operate in overlapped relationship.

It is thus seen that the underlying principles of the present invention have various applications and that the number of units that a particular computer is composed of depends on the minimum time spacing between airplanes that is to be practiced in the use of such computer and associated apparatus. If for instance one minute separation between airplanes is to be practiced it can be readily seen that the second airplane to be called from the holding stack might actually leave the holding stack before the first airplane called exits from such holding stack. In this case, however, proper horizontal separation will be effective after the turn time for the first of these two airplanes had been called and the airplane had completed its semi-circular turn, this for the reason that the first airplane of the two that was called would obviously have assumed the lower of the two altitudes under consideration and the turn time for the second airplane would be called at least one minute later, that is, the out-time for the second airplane would be at least one-half minute longer than the out-time for the first airplane. It is thus seen that vertical separation and spacing in both the stack and loop must be religiously adhered to before the calling of the turn time but that after such turn time has been called it is possible to rely on horizontal separation of airplanes. For this reason it may be considered safe to have rules, which must be adhered to, to the effect that an airplane may descend toward the runway after his turn time has been announced to him even though there is another airplane in the altitude below by reason of the fact that horizontal separation exists. The only possible danger by the employment of such rules is that the first of the two airplanes might fail to fully clear the runway in time. The spacing between airplanes would therefore be somewhat dependent upon whether there is sufficient room along the side of the runway and on the terrain adjacent the runway.

Another problem that would seem to need some consideration is the fact that if very close separation of airplanes, say one minute separation, is practiced, there is a possibility that two airplanes called successively will leave the holding stack at exactly the same instant as already above pointed out. If this were to occur it would be desirable to have these two airplanes operating under different radio carrier frequencies so that different operators could talk to the pilots at the same instant and each operator could announce the proper heading angle to such pilot as he leaves the holding stack. As already pointed out hereinbefore if desired the airplanes, as they enter the holding stack, may be assigned specific carrier frequencies to which they shall tune their radio receivers for landing purposes and if these carrier frequencies are distributed among the airplanes successively in accordance with successive altitudes it will be impossible for two adjacent altitudes to have their radio sets tuned to the same carrier frequency. In other words, the invention may be practiced by the employment of a single operator and a single carrier frequency if the spacing between airplanes is increased to a value where two successively called airplanes cannot possibly exit from the holding stack at the same time. Also, the invention may be practiced by having each operator take care of the airplanes of a particular commercial airway company which uses its particular carrier frequency and to make an effort to have these operators bring in their airplanes interspersed with airplanes of another company so that the airplanes on two adjacent altitudes in the stack will not be tuned to the same carrier frequency. Also, if a single operator is at the board he may at any time turn his separation knob 56 to a longer spacing time and thereby avoid the problem of having two airplanes exit from the holding stack at the same time. Also, a situation may arise where the separation time is set to a value of one or two minutes and if the operator desires to space the airplanes farther apart he will merely allow the particular unit of the computer then initiated to run to its minimum out-time position where all the computers are held at rest and may then call the airplane next in order at such time as he deems proper. As already pointed out hereinbefore altitude separation, at least before the turn time has been called, requires that no airplane be called to the next lower altitude until this lower altitude has been vacated. In this connection it should be understood that a pilot may pronounce his altitude vacated as soon as he has been ordered to the next lower altitude by reason of the fact that he may immediately nose his airplane downward and there is no possible reason why he should not vacate the altitude in time because there is absolutely nothing that can prevent a pilot from proceeding to a lower altitude except fog under visual flying and the present invention contemplates blind flying and blind landing facilities to be provided. In fact, the radio beacons hereinbefore described enable such blind flying insofar as pattern flying is concerned and special apparatus for blind landing may be necessary and are assumed available under severe low altitude fog conditions. Also, if pilots fly by the rule that they may descend to lower altitudes without instructions after the turn instruction has been issued to them irrespective of whether they occupy the first, the second or the third altitude above the ground this rule should also include instructions that when pilots so descend they will report each altitude as it is vacated by them. This is necessary in order that the operator may call other airplanes which have not yet had turn instruction issued to them so that they may be instructed to proceed to lower altitudes. This is also necessary in order that the operator and his companion monitor may advance the token of each airplane to the next lower altitude as the next altitude above is vacated. These rules may be used and many others may be devised in practicing the present invention.

One feature of the system disclosed herein that should not be lost sight of is the feature that delay in excess of maximum stack-loss time in calling a particular airplane from the holding stack automatically stops all subsequently to be initiated units of the computer and also stops the unit for that particular airplane at this maximum stack-loss position (minimum out-time position). These subsequently to be initiated units are stopped in some cases and in others are not initiated due to stopping of the timing apparatus shown in Fig. 4. The unit of the computer preceding in operation the unit under consideration is allowed to continue to operate if it has not yet reached the full out-time position which it ordinarily will have done. This feature not only affords protection against possible collision but also guards against confusion in that after a computer unit has been stopped at a minimum out-time position the airplane assigned to that unit will be landed by consuming a minimum out-time irrespective of the time it spent in the holding stack after having been called. In other words, under some conditions the delay in calling an airplane from the holding stack will not at all delay the airplane in that the computer starts operating when the green lamp for that unit and airplane is lighted even though the airplane is called later and the out-time will be correspondingly shortened because the computer actually operated even though the pilot did not know it.

In the specific system illustrated provision has been made for three operators. The fact that three control boards X, J and Z have been illustrated has no bearing on the fact that a three-unit computer has been shown. In practicing the invention where air traffic is extremely heavy, a four-unit computer and five control boards, each having its distinctive radio carrier frequency, could, for instance, be used. Each control board would preferably have associated therewith a monitor's board manipulated by an individual monitor.

It is thus seen that the overlapped landing system of the present invention has wide and varied application and that it is extremely flexible so that it may be used as conditions and extent of air traffic demand.

*Modified pattern (Fig. 18.)*—The invention of the present application may be applied to various kinds of flying patterns. For obvious reasons the laddering down apparatus disclosed herein applies to all forms of maneuver patterns, but nevertheless this apparatus may take various forms. For instance, the token itself may constitute the means for indicating occupancy and non-occupancy of a particular altitude when only one operator and one monitor is contemplated. In this case the red and green lamps on the token board illustrated may be omitted. When so modified the presence of a token at a particular altitude manifests occupancy whereas the absence of a token with the yellow lamp extinguished manifests unoccupancy.

The invention disclosed with minor modification may, for instance, be used in connection with a flying pattern such as illustrated in Fig. 18. This flying pattern requires at least three and preferably four markers, radiophares or radio beacons RB3, RB4, RB5 and RB6. This flying pattern contemplates that airplanes when called from the holding stack HS2, of the same shape and size as that of Fig. 1 but differently oriented with respect to the runway and shown by solid lines, will continue its flight in the same direction into the holding loop HL2 of various lengths, shown by dotted lines. As specifically illustrated the holding stack has two straight runs each 1.5 minutes flying time long connected at their ends by two semi-circular turn patterns each one minute flying time long. From earlier discussion it is readily seen that in the pattern shown in Fig. 1 and also the one shown in Fig. 18 the maximum stack-loss time under no-wind conditions is 2.5 minutes. It is readily understood that in this case the minimum storage loop time may, for instance, be as low as one minute and if such minimum storage loop time is selected then the minimum out-time (maximum stack-loss time of 2.5 minutes) will be one-fourth minute, the maneuver time will be 3.5 minutes and the total time set up in the computer under no-wind condition will be 3 minutes. Under different head wind and tail wind conditions the time in the computer will be changed as by changing the adjusted positions of the racks 65 and/or 66. Also the total time set up in the computer may be changed by changing the meshed relationship of these racks 65 and 66 with the rack pinions 142 and 155, respectively. Also, since the use of the flying pattern illustrated in Fig. 18 does not present any problem of variable 2X time value the speed of the pinion 91 will be 2 R. P. M. when the gear 98 engages the middle cone gear 237 of the gear cone 100. The computer illustrated in Figs. 8A and 8B slightly modified, as just pointed out, may be used with the flying pattern illustrated in Fig. 18 and will very accurately compute the out-time as required. When the computer is so modified and used the heading angle indication will be entirely disregarded. The head and tail wind cams 165 and 166 and the control knob will be used in the same manner as hereinbefore described. The operation of the system with the computer so modified (speed of pinion 91 of 2 R. P. M. and a total time in the computer of 3 minutes) is the same as heretofore described, except for omission or disregard of the heading angle computation, for which reason description of operation of the system so modified and used with the flying pattern of Fig. 18 is believed unnecessary and is dispensed with. Insofar as side wind effect, when employing the flying pattern of Fig. 18 is concerned, such side wind may be disregarded in that for northward flying the pilot has one or more radio beacons RB5 and RB6 to home toward and for southward flying he has one or more radio beacons RB3 and RB4 to home toward. And although side winds may cause an airplane to fly slight curved paths instead of straight lines the time error involved is so small that the error may be disregarded.

The applicants have thus shown and described several embodiments of an airplane approach control and landing system which coordinate vertical separation with overlapping horizontal separation and which coordinates a plurality of controllers or dispatchers, and although rather specific embodiments of computers have been disclosed it should be understood that this has been done merely for the purpose of disclosing the underlying principles involved and the manner in which these principles may be applied and that certain features of the invention may be employed whereas other features are omitted and that other changes, modifications and additions may be made without departing from the spirit and scope of the inventions except as demanded by the scope of the following claims.

What we claim is:

1. In a control system for landing random spaced airplanes on a runway at equally spaced intervals wherein markers on the ground identify fix points for airplanes flying at different levels of a holding stack and a two-way radio communication system providing for the transmission of data from the airplanes to a control tower as they pass said markers and providing for the transmission of data from the control tower to the airplanes concerning the landing procedure the airplanes should follow, the combination with said markers and radio communication system of a plurality of computer units in the control tower, each computer unit for computing the essential characteristics of a holding loop for an airplane in accordance with the time lost by that airplane in said holding stack between its call over said radio communication system to land and its report over said radio communication system that it has passed one of said radio markers, each of said computer units having a timer operable through a predetermined cycle of travel, and each of said computer units having a heading indicator operated by its timer, control means for each of said computer units for designating the use of that unit in computing the landing maneuver of a selected airplane, a separation timer operable through successive cycles of operation of predetermined duration shorter than said predetermined times of the computer cycles, a stepper operable step-by-step at a rate determined by the operation of said separation timer through its successive cycles of operation, said stepper being effective on each step to initiate a predetermined one of said computer units, and said stepper being continuously operated step-by-step only so long as each of said computer units is in turn designated for use by said contact means subsequent to its initiation by said stepping means, whereby the airplanes may be evenly spaced at shorter intervals than required for any one landing maneuver by using said computer units in succession for successive landing maneuvers.

2. In a system for spacing airplanes when landing from a holding stack through respective holding loops variable in size between maximum and minimum limits, the combination with markers on the ground for locating said holding stack, a two-way radio communication system between the airplanes and a control tower, apparatus in the control tower comprising; a plurality of computer units for computing respective landing maneuvers and measuring respective stack-loss and loop-loss time during a computer cycle for each maneuver, each of said computer units being operable through a computer cycle when initiated and effective when initiated to determine the size of said holding loop for a landing maneuver as being maximum or minimum in accordance with a measured respective minimum or maximum stack-loss time for that landing maneuver, separation timing means for successively initiating said computer units one at a time at intervals comparable to the desired even spacing of airplanes upon landing, manually operable means for each of said computer units for designating when an airplane having its landing maneuver computed by that computer unit leaves the holding stack as reported over said radio communication system, and contact means associated with each of said computer units effective when its associated computer unit has measured said maximum stack-loss time without said manually operable means having been actuated to interrupt the operation of all of said computer units that may be measuring stack-loss time and said separation timing means until such time as said manually operable means is actuated for the computer unit that has been effective to interrupt the operation.

3. In a system of the character described for spacing the landings of a plurality of unevenly spaced airplanes from a holding stack, the combination with radio beacons locating said holding stack and radio telephone communication apparatus, of control tower apparatus comprising; a plurality of computer units for timing the landing maneuver operations of the respective airplanes, each of said computer units having a timer operable through a predetermined landing maneuver cycle of travel, each of said computer units having a heading indicator operated in accordance with its timer, and each of said computer units including contacts operated a predetermined time after initiation of that computer unit, control means effective for each of said computer units for designating the use of that unit in computing the landing maneuver operations of an airplane reported over said radio telephone as leaving the holding stack at one of said radio beacons, a separation timer, a stepper operable step-by-step at a rate determined by said separation timer through successive cycles of operation, circuit means for initiating one of said computer units into a computer cycle for each stepping operation of said stepper, and circuit means including said contacts effective to stop the timer of all subsequently initiated computer units and said separation timer upon failure to designate the use of a computer unit for a landing maneuver by said control means within a predetermined time after that computer unit has been initiated.

4. In a system for spacing the landings of airplanes from a holding stack through respective holding loops of variable size greater than a predetermined minimum limit, apparatus at a control tower comprising; a plurality of computer units, each of said computer units being operable when initiated through a computer cycle to determine the size of said holding loop for a landing maneuver as being a minimum size in accordance with a measured maximum stack-loss time for that landing maneuver, each of said computer units having contact means associated therewith actuated at the end of said maximum stack-loss time, and each of said computer units having first and second timing means for timing landing maneuvers respectively in the holding stack and in a holding loop, manually operable means for each of said computer units for designating when an airplane having its maneuver computed by that unit leaves the holding stack, means for successively initiating said computer units at predetermined intervals, and circuit means including said contact means for interrupting said first timing means of each of said computer units when that computer unit reaches said maximum stack-loss time prior to the actuation of said manually operable means for that computer unit, said circuit means being effective to interrupt said first timing means of all other computer units but being ineffective to interrupt said second timing means of computer units that are at that time timing the landing maneuver of airplanes within respective holding loops, whereby upon failure of an airplane to report leaving a holding stack prior to the expiration of the maximum stack-loss time all other computer units that may have been initiated for measuring stack-loss time are stopped, but computer units measuring loop-loss time continue their operation.

5. In a system of the character described for evenly spacing the landings of a plurality of unevenly spaced airplanes from a holding stack through a holding loop of variable size in accordance with a computed loop-loss time required to be consumed for an even spacing of the landing of the airplanes, control tower apparatus comprising; a plurality of computer units, each unit effective when initiated to operate through a predetermined cycle of travel, each of said computer units being effective when rendered active to time a landing maneuver from said holding stack so as to define a time and direction of flight an airplane must maintain in order that it may be in such a position that a procedure turn at the expiration of the computer cycle may align the airplane with a landing strip, and means for initiating said computer units one at a time at equally spaced intervals, each of said intervals being shorter than the least time that can be consumed in a single cycle of travel of any one of said computer units.

6. In a system for evenly spacing the landings of a plurality of unevenly spaced airplanes from a holding stack of defined size through respective holding loops of variable sizes in accordance with a computed loop-loss time to be consumed for evenly spacing the airplanes at time of landing, the combination with stepping means actuated step-by-step at intervals comparable to a predetermined desired separation time for the landing of airplanes, of a plurality of computer units having respective timer and heading indication mechanisms, one computer unit being provided for each of the steps of said stepping means and being initiated by that step, each of said computer units being effective when initiated by said stepping means to operate during a predetermined cycle of travel at one speed for timing the maneuver of an airplane in the holding stack and at another speed for timing the maneuver of an airplane in the holding loop, and each of said computer units being effective to indicate the heading an airplane must fly upon leaving the holding stack during a computer cycle in order that a procedure turn at expiration of the computer cycle may align the airplane with a landing strip.

7. In a system for evenly spacing the landings of a plurality of unevenly spaced airplanes held in a holding stack by computing time to be lost in a holding loop; radio telephone communication apparatus at a control tower for communicating with airplanes making landing maneuvers, a separation timer for determining the separation landing time of the respective airplanes, a stepper operated step-by-step at a rate determined by said separation timer, a plurality of multiple speed timer units, one timer unit for each step of said stepper, a heading indication dial for each of said timer units, said dial being driven by its associated timer unit, electro-responsive means for simultaneously initiating each of said timer units and said heading indication dial when the step is reached by said stepper belonging to that timer unit, and manually operable means associated with each of said timer units effective when actuated to increase the speed of that timer unit and stop its associated heading indication dial, whereby upon a controller being informed over said radio telephone that an airplane is entering a holding loop he can actuate said manually operable means and thereby initiate the timing of flight in the holding loop by increasing the speed of the timer unit and also establish an outbound heading for the airplane in accordance with the position of the heading indication dial associated with that timer unit at that time, and whereby a controller can inform a landing airplane of the proper out bound heading for its holding loop.

8. In a system for evenly spacing the landings of a plurality of unevenly spaced airplanes in a holding stack located near an airport by computing the loop-loss time required of each airplane in a holding loop of variable size in order that the airplanes may be evenly spaced upon landing, a plurality of computer units, each unit including a timer mechanism effective when initiated to operate through a predetermined cycle of travel, each of said computer units being effective when initiated to time a landing maneuver of an airplane from said holding stack through a holding loop during its cycle of operation at selected speeds dependent upon whether the flight is being timed in the holding stack or is manually designated as being timed in the holding loop, and each of said computer units being effective to indicate the heading an airplane must fly upon leaving the holding stack in order that a procedure turn at the expiration of the computer cycle may align the airplane with a landing strip, and means for initiating said computer units into their respective cycles of travel one at a time at uniformly spaced intervals.

9. In an approach control system for evenly spacing the landings of airplanes from a holding stack through holding loops of variable size, radio beacons near an airport for determining the limits of said holding stack, a radio telephone communication system between the airplanes and a tower, apparatus at a tower controller's office comprising; manually operable means for designating when an airplane leaves the holding stack at a particular radio beacon as reported over said radio communication system, a stepper operable step-by-step at a predetermined rate, computer units for the respective steps of said stepper, each of said computer units having a timer initiated in response to its associate step at a particular speed for measuring the stack-loss time of a landing maneuver, each of said computer units being effective in response to said manually operable means to change its speed of operation for measuring the loop-loss time of a landing maneuver, and each of said computer units having a heading indicator driven in accordance with said timer of that unit so as to indicate a heading for flying the holding loop when said manually operable means is actuated, said heading being governed in accordance with the stack-loss time that has been measured by the associated timer prior to the actuation of said manually operable means.

10. In an approach control system of the character described for evenly spacing the landings of airplanes that are unevenly spaced in a holding stack by computing respective patterns of flight in holding loops of variable size, the combination with markers defining the limits of said holding stack and radio telephone communication means for communication between an airport tower and airplanes, of apparatus at the tower comprising; a stepper operable step-by-step at a predetermined rate, a plurality of computer units, one unit being provided for each step of said stepper, means responsive to each step of said stepper for initiating the associated computer unit into a maneuver timing operation for timing the portion of an airplane's landing maneuver consumed within the holding stack, said means being effective to visually indicate the initiation of the computer unit and thereby inform a controller that he may transmit over said radio telephone instructions for an airplane to begin a landing maneuver, each of said computer units having a heading indicator driven in accordance with the stack-loss time measured by that computer unit in order to indicate the proper pattern of flight of the holding loop, manually operable means effective when actuated upon the reception of a report over said radio telephone of an airplane leaving the holding stack for stopping said heading indicator for the computer unit timing the landing maneuver of that airplane and initiating the timing of the landing maneuver in the holding loop for a direction of flight indicated by the heading indicator.

11. In an approach control system for evenly spacing the landings of airplanes through landing maneuvers of time intervals greater than the desired separation time of the airplanes upon landing, apparatus at a landing controller's office comprising; manually operable means for designating when an airplane leaves a holding stack, stepping means operable step-by-step at a rate in accordance with the desired spacing of the airplanes upon landing, a computer unit for each of the steps initiated by that step into a period of timing stack-loss time during a landing maneuver and into a period of indicating the heading an airplane must fly in a landing maneuver upon leaving the holding stack in order that a procedure turn at the end of a computed loop-loss time interval required for even spacing of airplanes may align the airplane with a landing strip, and each of said computer units being effective in response to said manually operable means for designating an airplane leaving the holding stack to time the out-bound flight from the holding stack.

12. In a system for spacing airplanes during landing operations involving the flight of each airplane through a holding stack and a holding loop to the ground, control tower apparatus comprising; a separation timer having a manually adjustable setting for determining the separation landing time of respective airplanes, a stepper operated step-by-step at a rate determined by said separation timer in accordance with its setting, a plurality of multiple speed timer units, one timer unit for each step of said stepper, each of said timer units being operable at respective selected speeds through a predetermined cycle of travel, and each of said timer units being initiated at a low speed by said stepper for measuring stack-loss time, manually operable means associated with each of said timer units effective when actuated to increase the speed of that timer unit for timing the flight of an airplane in the holding loop, and indication means controlled by the respective timer units effective to indicate to a controller when each of said timer units initiates and completes its timing cycle.

13. In a system for spacing airplanes during landing operations, a separation timer having a manually adjustable setting for governing the separation landing time of airplanes, a stepper operated step-by-step at a rate determined by said separation timer in accordnce with its setting, a plurality of timer units for timing landing maneuvers of respective airplanes, one timer unit being provided for each step of said stepper and each of said timer units being initiated by its associated step, and indication means associated with each of said timer units rendered active in accordance with the operation of that timer unit to indicate when an airplane should make a prescribed landing operation, whereby said separation timer determines the separation time between landing operations, and the operation of the timer units through respective cycles can be used to indicate the relative time required to be spent by the respective airplanes in a holding loop.

14. In a system for spacing airplanes during landing operations, control apparatus at a controller's office comprising, a plurality of timer units, each timer unit being provided for use in timing landing operations of an airplane so as to determine time of flight in a holding loop, a separation timer having a manually adjustable time setting effective when rendered active to indicate when a separation time for landing respective airplanes has elapsed, stepping circuit means effective to initiate said timer units in sequence at time intervals governed by said separation timer, and indicator means associated with each of said timer units and governed thereby so as to be indicative of times when an airplane should initiate given landing procedures during each landing maneuver in order that such airplane may land at an interval spaced from a preceding airplane as determined by said separation timer.

15. In a system for spacing airplanes during landing operations, control apparatus at an approach controller's office comprising, a plurality of landing maneuver timer units for use in timing landing approaches of respective airplanes, each of said units being operable through a predetermined cycle of travel and effective to close circuit connections at the end of each cycle of operation, a separation timer having an adjustable time setting effective when rendered active to indicate when a predetermined separation time for landing respective airplanes has elapsed, stepping circuit means effective to initiate said landing maneuver timer units, one at a time, at intervals spaced by said separation timer, and visual indicating means associated with each of said landing maneuver timer units distinctively conditioned in response to the completion of each cycle of operation of its associated timer unit, whereby an approach controller is informed when it is time for a particular landing procedure of a particular airplane having its landing approach timed by that timer unit.

16. In a system for evenly spacing the landing of airplanes, control apparatus at a controller's office comprising, a plurality of timer units effective when initiated to time landing operations of respective airplanes in a holding stack and a holding loop, a separation timer having a manually adjustable time setting effective when rendered active to indicate when a separation time for landing respective airplanes has elapsed, stepping circuit means having a step for each of said timer units, said stepping means being rendered active step-by-step for governing the initiation of the respective timer units one at a time, only at a rate determined by said separation timer in accordance with its setting.

17. In a system of the character described for computing the size of respective holding loops for the spacing of airplanes to be landed from a holding stack, control tower apparatus comprising; a computer unit operable through a computer cycle to compute the size of a holding loop in accordance with a measured stack-loss time, a plurality of control boards, each of said boards having a plurality of indicators disposed thereon for use in indicating respective stages in a landing maneuver, manually operable means on each of said control boards for actuation in designating respective stages in a landing maneuver, lock relays for the respective boards, circuit means for energizing each of said lock relays in response to the actuation of said manually operable means for its associated board, indication circuit means for energizing one of said indicators on each of said boards when said computer unit is initiated, provided that all of said lock relays are deenergized, said indication circuit means being effective in response to the energization of one of said lock relays to extinguish said one indicator for each of the other boards, circuit means for energizing another indicator for a board in response to actuation of said manually operable means for designating an airplane leaving the holding stack during a landing maneuver, said another indicator being energized only if said lock relay for that board is energized, and circuit means for energizing still another indicator for a board in response to said computer having completed its operating cycle, said still another indicator being energized only if said lock relay for that board is energized.

18. In an organization of the character described for computing landing maneuvers of respective airplanes from a holding stack through holding loops of variable size, control tower apparatus comprising; a computer unit operable through a computer cycle to compute the size of a holding loop in accordance with a measured stack-loss time, a plurality of control boards, each of said boards having an indicator lamp disposed thereon together with manually operable means for designating the use of said computer by the controller of that board, circuit means effective upon the initiation of a computer cycle for steadily energizing said indicator lamp on each of said boards, and circuit means responsive to the actuation of said manually operable means for one board for changing the energization of said indicator lamp for that board from steady to flashing energization and extinguishing the indicator lamps for all other boards, whereby the steady energization of the indicator lamp without said manually operable means actuated indicates availability of said computer for use by that board in computing a landing maneuver, and whereby the flashing of said indicator lamp indicates that the computer has been designated for use by that board and an airplane should be called for initiating a landing procedure.

19. In an organization for computing landing maneuvers of respective airplanes from a holding stack through holding loops of variable size, apparatus at a control tower comprising; a computer unit operable through a computer cycle to compute the size of a holding loop in accordance with a measured stack-loss time, a control board having a plurality of indicator lamps and manually operable contact means disposed thereon for distinctively designating and indicating respective stages in a landing maneuver, a first indication circuit means for flashing one of said indicator lamps when said computer is starting its computer cycle, said circuit means being effective to change the flashing of said one indicator lamp to steady energization upon actuation of said manually operable means for designating that an airplane has acknowledged being called for initiating a landing maneuver, a second indication circuit means for flashing another of said indicator lamps when said manually operable means is actuated for designating an airplane leaving the holding stack during a landing maneuver, said second indication circuit means being effective to change the flashing of said another indicator lamp to steady energization upon actuation of said manually operable means for designating that an airplane has acknowledged receiving heading instructions for flight upon leaving the holding stack, and a third indication circuit means for steadily energizing still another of said indicator lamps in response to said computer nearing the end of its computer cycle, said third indication means being effective to change the steady energization of said another indicator lamp to flashing when said computer actually reaches the end of its computer cycle as an indication to a controller that he should instruct an airplane making a landing maneuver to make a procedure turn preparatory to landing.

20. In an organization for computing landing maneuvers for the respective airplanes in a holding stack near an airport, apparatus at a control tower comprising; a computer operable through a computer cycle to compute the size of a holding loop in accordance with a measured stack-loss time, a control board having a plurality of indicators disposed thereon for use in indicating respective stages in a landing maneuver, a plurality of control buttons on said control board for actuation in designating respective stages in a landing maneuver, electro-responsive means effective to energize one of said indicators when said computer is initiated to indicate to the controller that an airplane should be called to initiate a landing maneuver from the holding stack, electro-responsive means effective to energize another of said indicators when one of said buttons is actuated for designating an airplane leaving the holding stack, and electro-responsive means effective to energize still another of said indicators in response to said computer having completed a computer cycle.

21. In a system for evenly spacing the landings of airplanes from a holding stack, control office apparatus comprising; a computer unit operable through a computer cycle for computing loop-loss time required for evenly spacing the airplanes, a plurality of boards, one for each of a plurality of controllers, each of said boards having one manually operable means for designating the use of said computer for a computer cycle and having another manually operable means for when rendered effective acting upon said computer to designate an airplane's progress in a landing maneuver, and electro-responsive means associated with each of said boards rendered effective in accordance with the actuation of said one manually operable means to render said electro-responsive means for all other boards ineffective throughout the remainder of the computer cycle, and circuit means for rendering said another manually operable means effective to act upon said computer only when said electro-responsive means for that board is active.

22. In a system for evenly spacing the landings of unevenly spaced airplanes from a holding stack by computing holding loops of different sizes for respective landing maneuvers, a computer unit intermittently initiated into respective computer cycles of operation for computing holding loop size in accordance with stack-loss time, a plurality of control boards, one board for each of a plurality of controllers, each of said boards having disposed thereon manually operable means and indicator means associated with said computer unit, circuit means for energizing said indicator means on each of said boards when said computer unit is initiated into a computer cycle, and electro-responsive means for each of said boards rendered effective in response to the actuation of said manually operable means on that board for deenergizing the indicator means on the other boards and thereby indicate to the controllers of said other boards that the computer is not available to them for use.

23. In a system of the character described for computing holding loop size for evenly spacing the landings of airplanes from a holding stack, a plurality of computer units, each unit being operable when initiated through a computer cycle for computing holding loop size in accordance with stack-loss time consumed during a landing maneuver, a plurality of control boards, one for each of a plurality of controllers, each of said boards having disposed thereon manually operable means for designating the use of any selected one of said computer units for computing a landing maneuver, electro-responsive means for each of said boards and for each of said computer units rendered active in response to the actuation of said manually operable means for the associated computer unit on that board, said electro-responsive means for one computer unit and one board when rendered active being effective to prevent said electro-responsive means being rendered effective for any other board for that same computer unit, and computer control means associated with each of said computer units and with each of said boards effective to act upon its associated computer unit only provided said electro-responsive means for that computer unit and for that board is actuated.

24. In a system for computing holding loop size for spacing landing of airplanes from a holding stack, a computer operable through a computer cycle for computing holding loop size in accordance with stack loss time consumed during a landing maneuver, a plurality of control boards, one for each of a plurality of controllers, each of said boards having disposed thereon manually operable means for designating the use of said computer for computing a landing maneuver, electro-responsive means for each of said boards actuated in response to the actuation of said manually operable means on that board, said electro-responsive means when actuated for one board being effective to prevent said electro-responsive means from being actuated for any other board, and computer control means associated with each of said boards effective when actuated to act upon said computer only provided said electro-responsive means for that board is actuated.

25. In a system of the character described for governing the spacing of airplanes while landing from a holding stack, a plurality of computer units for computing holding loop size for respective landing maneuvers, a plurality of control boards, each of said control boards having a plurality of token jacks disposed thereon in respective vertical rows, one row being provided for each of said computer units, and one jack being provided in each row for each of a plurality of altitudes from which airplanes may start their landing maneuvers, a lock relay for each of said rows of jacks, circuit means for energizing said lock relay in response to insertion of a token into a jack of its associated row, stick circuit means for maintaining said lock relay energized during a landing maneuver, irrespective of the movement of said token from one jack to another, and manually operable means on each of the boards for controlling said computer units respectively, said manually operable means being effective when actuated only provided that said lock relay for the row of jacks corresponding to that computer unit on that board is energized.

26. In a control system for governing the landings of airplanes, a multiple unit computer each unit of which is capable of computing both the direction an airplane is to head into a holding loop and the out-time to the turn point in such holding loop comprising, direction indicating means for each unit, time indicating means for each unit, means for operating both of said indicating means of a unit at a particular speed so long as an airplane flies in a holding stack adjacent such holding loop after having been called for a landing maneuver, means for operating said time indicating means at a second speed upon said airplane entering said holding loop, said second speed being equal to said particular speed multiplied by the total maneuver time minus the stack-loss time minus a constant divided by the out-time, and other timing means for rendering said units successively effective one at a time and at time spaced intervals.

27. In a system for governing the laddering down and landing of airplanes from a holding stack comprising, a multiple altitude holding stack and a multiple altitude holding loop adjacent thereto, one control and indication board including manually operable control devices and visual indicating devices for displaying information as to the altitude distribution of airplanes in said holding stack and holding loop, and another control and indication board and associated apparatus including manually operable control devices and visual indicating devices for displaying information as to landing factors and the progress of airplanes in overlapping landing maneuvers in said holding stack and holding loop, whereby both vertical and horizontal separation is displayed and assured for airplanes making landing maneuvers in overlapped relationship.

28. In a system for governing the laddering down and landing of airplanes from a holding stack comprising; a multiple altitude holding stack and a multiple altitude holding loop adjacent thereto; one control and indication board including manually operable control devices, one token for each airplane to identify the same and its altitude by the location of the token on the board and visual indicating devices for displaying information as to prospective altitude occupancy by airplanes in said holding stack and holding loop; and another control and indication board and associated apparatus including a computer, visual indicating devices and manually operable control devices for controlling said computer and visual indicating devices; said computing and displaying information as to landing factors and the progress of airplanes in overlapping landing maneuvers in said holding stack and holding loop; whereby both vertical and horizontal separation is displayed and assured for airplanes making landing maneuvers in overlapped relationship.

29. In a system for governing the laddering down and landing of airplanes from a holding stack comprising; a multiple altitude holding stack and a multiple altitude holding loop adjacent thereto; one control and indication board including manually operable control devices and visual indicating devices for displaying information as to the altitude distribution of airplanes in said holding stack and holding loop; and another control and indication board and associated apparatus including a computer for computing the out-time to the turn point in a holding loop, manually operable control devices for controlling said computer, and visual indicating devices controlled by said manually operable control devices and said computer for displaying information as to the progress of airplanes in overlapping landing maneuvers in said holding stack and holding loop; whereby both vertical and horizontal separation of airplanes making overlapped landing maneuvers is assured.

30. In a system for computing the out-time to the turn point in an airplane holding loop for airplanes making landing maneuvers in succession in overlapped relationship comprising, a plurality of computing units, means for initiating said units in succession at time spaced intervals, each of said units performing a holding-stack time measuring cycle and an out-time time measuring cycle, manually controlled means for each unit for concluding the holding-stack time measuring cycle and initiating the out-time cycle, and means for stopping all of said units when any one particular unit has operated for a period in excess of the maximum stack-loss time before said manually controlled means for that unit has been manually operated to initiate the out-time cycle.

31. In a control system to aid in the control of airplanes in a holding stack comprising; an operator's control board depicting a holding stack including a push button, an indicating lamp and a token jack for each altitude of said stack; a monitor's board depicting a holding stack including an indicating light and a token jack for each altitude of said stack; means for extinguishing said indicating lamps for a particular altitude in response to the depression of the push button for that altitude by the operator; means for again illuminating said lamps responsive only if thereafter a token is present in each of the two token jacks for that altitude simultaneously and then only if both of these token jacks are again removed; a computer; an indicating lamp associated with said computer; and a contact associated with a token jack of said operator's control board for controlling said last mentioned indicating lamp.

32. In a control system to aid in the control of airplanes in a holding stack comprising, a plurality of operator's control boards one for each operator, a token jack for each altitude on each control board, a multiple unit out-time computer, a panel for each unit of said computer for each operator's control board for controlling the units of said computer, interlocking means for interlocking the apparatus on said panels so that only one operator can control a particular computer unit, and means controlled by contacts on some of said token jacks for controlling said interlocking means.

33. In a system for governing the landings of airplanes, a multiple unit computer for computing the out-time to the turn point in an airplane holding loop comprising, a shaft for each unit which by the extent of its permissible rotation manifest a total computer time equal to the actual total time an airplane is to consume in a landing maneuver minus a constant, means for driving said shaft of a unit at one speed during the time an airplane consumes in a holding stack after having been called for a landing maneuver, means for driving said shaft at a second speed after such airplane enters a holding loop adjacent such holding stack, the ratio of said second speed to said one speed being as said total computer time minus the stack-loss time is to said out-time, and timing means for rendering said units operative one at a time at time spaced intervals.

34. In a system for governing the landings of airplanes, a multiple unit computer for computing the out-time to the turn point in an airplane holding loop comprising, a shaft for each unit which by the extent of its permissible rotation manifests a total computer time equal to the actual total time an airplane is to consume in a landing maneuver minus a constant, means for driving said shaft of a unit at one speed during the time an airplane consumes in a holding stack after having been called for a landing maneuver, means for driving said shaft at a second speed after such airplane enters a holding loop adjacent such holding stack, the ratio of said second speed to said one speed being as said total computer time minus the stack-loss time is to said out-time, timing means for rendering said units operative one at a time at time spaced intervals, and signal means rendered active when said shaft has been operated to the extent of its permissible rotation.

35. In a control system to aid in the control of airplanes in a holding stack comprising, a plurality of operator's control boards one for each operator, a token jack for each altitude on each control board, a multiple unit out-time computer, a panel for each unit of said computer for each operator's control board for controlling the units of said computer, interlocking means for interlocking the apparatus on said panels so that only one operator can control a particular computer unit, a monitor's board for each operator's control board, a token jack for each altitude on each monitor's board, an indicating lamp for each altitude on each operator's board and each monitor's board, means controlled by contacts on some of said token jacks on the controller's board for controlling said interlocking means, and means for controlling said indicating lamps requiring contemporaneous presence or contemporaneous absence of tokens in corresponding token jacks on said controller's boards and said monitor's boards.

OSCAR S. FIELD.
SEDGWICK N. WIGHT.
RALPH W. HEWES.

REFERENCES CITED

The following references are of record in the file of this patent:

UNITED STATES PATENTS

| Number | Name | Date |
|---|---|---|
| 1,999,047 | Hahnemann | Apr. 23, 1935 |
| 2,063,534 | Wallace | Dec. 8, 1936 |
| 2,268,240 | Brixner | Dec. 30, 1941 |
| 2,344,761 | Wight et al. | Mar. 21, 1944 |
| 2,373,771 | Maxson et al. | Apr. 17, 1945 |
| 2,399,671 | Gage | May 7, 1946 |
| 2,425,973 | Wight et al. | Aug. 19, 1947 |